US010347238B2

(12) United States Patent
Jin et al.

(10) Patent No.: US 10,347,238 B2
(45) Date of Patent: Jul. 9, 2019

(54) TEXT-BASED INSERTION AND REPLACEMENT IN AUDIO NARRATION

(71) Applicants: Adobe Inc., San Jose, CA (US); The Trustees of Princeton University, Princeton, NJ (US)

(72) Inventors: Zeyu Jin, Princeton, NJ (US); Gautham J. Mysore, San Francisco, CA (US); Stephen DiVerdi, Oakland, CA (US); Jingwan Lu, Santa Clara, CA (US); Adam Finkelstein, Princeton, NJ (US)

(73) Assignees: Adobe Inc., San Jose, CA (US); The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 15/796,292

(22) Filed: Oct. 27, 2017

(65) Prior Publication Data
US 2019/0130894 A1    May 2, 2019

(51) Int. Cl.
*G10L 13/08* (2013.01)
*G10L 15/02* (2006.01)
*G10L 13/04* (2013.01)
*G10L 13/07* (2013.01)

(52) U.S. Cl.
CPC .............. *G10L 13/08* (2013.01); *G10L 13/04* (2013.01); *G10L 13/07* (2013.01); *G10L 15/02* (2013.01)

(58) Field of Classification Search
CPC ............................. G10L 13/033; G10L 13/08
See application file for complete search history.

(56) References Cited

U.S. PATENT DOCUMENTS

| 5,490,234 A * | 2/1996 | Narayan | G10L 13/07 704/260 |
| 5,649,060 A * | 7/1997 | Ellozy | G06F 17/30746 704/278 |
| 5,740,320 A * | 4/1998 | Itoh | G10L 13/07 704/260 |
| 6,151,576 A * | 11/2000 | Warnock | G10L 15/26 704/235 |
| 7,623,755 B2 * | 11/2009 | Kuspa | G11B 27/034 386/278 |

(Continued)

OTHER PUBLICATIONS

Whittaker, Steve, and Brian Amento. "Semantic speech editing." Proceedings of the SIGCHI conference on Human factors in computing systems. ACM, 2004. (Year: 2004).*

(Continued)

*Primary Examiner* — Jialong He
(74) *Attorney, Agent, or Firm* — Finch & Maloney PLLC

(57) ABSTRACT

Systems and techniques are disclosed for synthesizing a new word or short phrase such that it blends seamlessly in the context of insertion or replacement in an existing narration. In one such embodiment, a text-to-speech synthesizer is utilized to say the word or phrase in a generic voice. Voice conversion is then performed on the generic voice to convert it into a voice that matches the narration. An editor and interface are described that support fully automatic synthesis, selection among a candidate set of alternative pronunciations, fine control over edit placements and pitch profiles, and guidance by the editors own voice.

16 Claims, 28 Drawing Sheets

(56) References Cited

U.S. PATENT DOCUMENTS

| | | | | |
|---|---|---|---|---|
| 7,689,421 | B2* | 3/2010 | Li | G10L 13/033 704/258 |
| 7,853,452 | B2* | 12/2010 | Gleason | G10L 13/033 704/258 |
| 7,869,892 | B2* | 1/2011 | Foust | G11B 27/031 700/94 |
| 7,870,488 | B2* | 1/2011 | Kirkpatrick | G06F 17/241 715/720 |
| 8,620,654 | B2* | 12/2013 | Khouri | G11B 27/036 704/235 |
| 8,862,472 | B2 | 10/2014 | Wilfart et al. | |
| 2009/0070115 | A1* | 3/2009 | Tachibana | G10L 13/07 704/260 |
| 2013/0205207 | A1* | 8/2013 | Asch | G09B 19/0053 715/704 |

OTHER PUBLICATIONS

Berthouzoz, Floraine, Wilmot Li, and Maneesh Agrawala. "Tools for placing cuts and transitions in interview video." ACM Trans. Graph. 31.4 (2012): 67-1. (Year: 2012).*

Rubin, Steve, et al. "Content-based tools for editing audio stories." Proceedings of the 26th annual ACM symposium on User interface software and technology. ACM, 2013. (Year: 2013).*

Masoodian, Masood, et al. "TRAED: Speech audio editing using imperfect transcripts." 2006 12th International Multi-Media Modelling Conference. IEEE, 2006. (Year: 2006).*

Casares, Juan, et al. "Simplifying video editing using metadata." Proceedings of the 4th conference on Designing interactive systems: processes, practices, methods, and techniques. ACM, 2002. (Year: 2002).*

Anthony, Sebastian, "Adobe demos 'photoshop for audio,' lets you edit speech as easily as text", Retrieved from the Internet: URL: https://arstechnica.com/information-technology/2016/11/adobe-voco-photoshop-for audio-speech-editing/, [retrieved on Oct. 26, 2017].

Rubin, S. et al., "Content-Based Tools for Editing Audio Stories", ACM, Mar. 2010, 10 pages.

Jin, Z. et al., "Cute: A concatenative method for voice conversion using exemplar-based unit selection", 2016 IEEE International Conference on Acoustics, Speech and Signal Processing (ICASSP), Mar. 20, 2016, 5 pages.

Van Den Oord et al., "Parallel WaveNet: Fast High-Fidelity Speech Synthesis", arXiv:1711.10433v1 https://arxiv.org/abs1T11.10433 (Nov. 28, 2017).

U.S. Appl. No. 16/108,996, "Real-Time Speaker—Dependent Neural Vocoder", (filed Aug. 22, 2018).

Van Den Oord et al., "WaveNet: A Generative Model for Raw Audio", arXiv:1609.03499v2 https://arxiv.org/abs/1609.03499 (Sep. 19, 2016).

Dutoit, "A Short Introduction to Text-to-Speech Synthesis", http://www.tcts.fpms.ac.be/synthesis/introtts_old.html (Dec. 17, 1999).

Wang et al., "Tacotron: A Fully End-to-End Text-to-Speech Synthesis Model", arXiv:1703.10135v1 https://arxiv.org/abs/1703.10135v1 (Mar. 29, 2017).

Sotelo et al., "Char2Wav: End-to-End Speech Synthesis", International Conference on Learning Representations 2017 Workshop Submission (2017).

Ramos, "Voice Conversion with Deep Learning", Técnico Lisboa Master's Thesis https://fenix.tecnico.ulisboa.pt/downloadFile/1689244997257288/thesis.pdf (Oct. 2016).

Kobayashi et al., "Statistical voice conversion with WaveNet-based waveform generation", Proc. Interspeech 2017, pp. 1138-1142, DOI: 10.21437/Interspeech.2017-986, pp. 1138-1142 (Aug. 2017).

Rethage et al., "A Wavenet for Speech Denoising", arXiv:1706.07162v1 https://arxiv.org/abs/1706.07162 (Jun. 22, 2017).

Engel et al., "Neural Audio Synthesis of Musical Notes with WaveNet Autoencoders", arXiv:1704.01279v1 https://arxiv.org/abs/1704.01279 (Apr. 5, 2017).

Tamamori et al., "Speaker-dependent WaveNet vocoder", Proc. Interspeech 2017, pp. 1118-1122, DOI: 10.21437/Interspeech.2017-314 (Aug. 2017).

Dudley, "The Vocoder—Electrical Re-Creation of Speech", Journal of the Society of Motion Picture Engineers, vol. 34, issue 3, pp. 272-278 (Mar. 1940).

Black et al., "Statistical Parametric Speech Synthesis", 2007 IEEE International Conference on Acoustics, Speech and Signal Processing (ICASSP '07), pp. 1229-1232 (Apr. 2007).

Imai et al., "Mel Log Spectrum Approximation (MLSA) filter for speech synthesis", Electronics and Communications in Japan (Part I: Communications) vol. 66, issue 2, pp. 10-18 (1983).

Le Paine et al., "Fast Wavenet Generation Algorithm", arXiv:1611.09482v1 https://arxiv.org/abs/1611.09482 (Nov. 29, 2016).

Arik et al., "Deep Voice: Real-time Neural Text-to-Speech", arXiv:1702.07825v2 https://arxiv.org/abs/1702.07825 (Mar. 7, 2017).

Cooley et al., "An algorithm for the machine calculation of complex fourier series," Mathematics of Computation, vol. 19, No. 90, pp. 297-301 (1965).

Machado et al., "Voice conversion: A critical survey", Proc. Sound and Music Computing, pp. 291-298 (2010).

Van Den Oord et al., "Conditional Image Generation with PixelCNN Decoders", arXiv:1606.05328v2 https://arxiv.org/abs/1606.05328 (Jun. 18, 2016).

Loizou, Summary of "Speech Enhancement: Theory and Practice, Second Edition", retrieved from https://www.crcpress.com/Speech-Enhancement-Theory-and-Practice-Second-Edition/Loizou/p/book/9781138075573 (published Mar. 31, 2017).

Kominek et al., "The CMU Arctic speech databases", 5th ISCA Speech Synthesis Workshop, Pittsburgh, PA, pp. 223-224 (2004).

Kingma et al., "Adam: A Method for Stochastic Optimization", arXiv:1412.6980v9 https://arxiv.org/abs/1412.6980 (Jan. 30, 2017).

Buhrmester et al., "Amazon's Mechanical Turk: A New Source of Inexpensive, Yet High-Quality, Data?", Perspectives on Psychological Science, vol. 6, issue 1, pp. 3-5 (2011).

McGraw, Summary of Chapter 3 in "Crowdsourcing for Speech Processing: Applications to Data Collection, Transcription and Assessment", retrieved from https://onlinelibrary.wiley.com/doi/abs/10.1002/9781118541241.ch3 (published Mar. 8, 2013).

Jin et al., "VoCo: Text-based Insertion and Replacement in Audio Narration", ACM Transactions on Graphics, vol. 36, No. 4, article 96, pp. 96:1-96:13 (Jul. 2017).

Cartwright et al., "Fast and easy crowdsourced perceptual audio evaluation", 2016 IEEE International Conference on Acoustics, Speech and Signal Processing Proceedings, pp. 619-623 (May 2016).

Parson et al., "Evaluating voice quality and speech synthesis using crowdsourcing", International Conference on Text, Speech and Dialogue, vol. 8082, pp. 233-240 (2013).

Loizou, Table of Contents for "Speech Enhancement: Theory and Practice, Second Edition", retrieved from http://www.gbv.de/dms/tib-ub-hannover/755610113.pdf, (published Mar. 31, 2017).

Acapela Group R&D, https://www.acapela-group.com/about-us/rd/ (retrieved Nov. 19, 2018).

Aihara et al., "Voice conversion based on non-negative matrix factorization using phoneme-categorized dictionary", In 2014 IEEE International Conference on Acoustics, Speech and Signal Processing (ICASSP), pp. 7944-7948 (2014).

Berthouzoz et al., "Tools for placing cuts and transitions in interview video", ACM Transactions on Graphics (TOG), vol. 31, issue 4, article 67 (Jul. 2012).

Boersma, "PRAAT, a system for doing phonetics by computer", Glot International, vol. 5, No. 9/10, pp. 341-347 (Nov./Dec. 2001).

Bregler, et al., "Video Rewrite: Driving Visual Speech with Audio", In Proceedings of the 24th Annual Conference on Computer Graphics and Interactive Techniques (SIGGRAPH '97), pp. 353-360 (1997).

Casares et al., "Simplifying video editing using metadata", In Proceedings of the 4th Conference on Designing Interactive Systems: Processes, Practices, Methods, and Techniques (DIS '02), pp. 157-166 (2002).

(56) References Cited

OTHER PUBLICATIONS

Chen et al., "Voice conversion using deep neural networks with layer-wise generative training", IEEE/ACM Transactions on Audio, Speech, and Language Processing, vol. 22, No. 12, pp. 1859-1872 (Dec. 2014).
Conkie et al., "Optimal coupling of diphones", Second ESCA/IEEE Workshop on Speech Synthesis, pp. 119-122 (Sep. 1994).
Desai et al., "Voice conversion using Artificial Neural Networks", In Proceedings of the 2009 IEEE International conference on Acoustics, Speech and Signal Processing (ICASSP 2009), pp. 3893-3896 (2009).
Dutoit et al., "Towards a Voice Conversion System Based on Frame Selection", In 1988 International Conference on Acoustics, Speech and Signal Processing (ICASSP-88), vol. 4, pp. IV-513-516 (May 2007).
Forney, Jr., "The Viterbi Algorithm", Proceedings of the IEEE, vol. 61, No. 3, pp. 268-278 (Mar. 1973).
Fujii et al., "High-Individuality Voice Conversion Based on Concatenative Speech Synthesis", International Journal of Electrical and Computer Engineering, vol. 1, No. 11, pp. 1625-1630 (2007).
Germain et al., "Equalization Matching of Speech Recordings in Real-World Environments", In 2016 IEEE International Conference on Acoustics, Speech and Signal Processing (ICASSP), DOI: 10.1109/ICASSP.2016.7471747 (Mar. 2016).
Hertzmann et al., "Image Analogies", In Proceedings of the 28th Annual Conference on Computer Graphics and Interactive Techniques (SIGGRAPH '01), pp. 327-340 (2001).
Hunt et al., "Unit selection in a concatenative speech synthesis system using a large speech database", 1996 IEEE International Conference on Acoustics, Speech, and Signal Processing Conference Proceedings, pp. 373-376, DOI: 10.1109/ICASSP.1996.541110 (May 1996).
Kain et al., "Spectral voice conversion for text-to-speech synthesis", In Proceedings of the 1998 IEEE International Conference on Acoustics, Speech and Signal Processing (ICASSP '98), pp. 285-288, DOI: 10.1109/ICASSP.1998.674423 (May 1998).
Kawahara et al., "TANDEM-Straight: A temporally stable power spectral representation for periodic signals and applications to interference-free spectrum, F0, and aperiodicity estimation", In 2008 IEEE International Conference on Acoustics, Speech and Signal Processing (ICASSP 2008), pp. 3933-3936 (2008).
Kubichek, "Mel-cepstral distance measure for objective speech quality assessment", In Proceedings of IEEE Pacific Rim Conference on Communications Computers and Signal Processing, DOI: 10.1109/PACRIM.1993.407206, pp. 125-128 (May 1993).
Levine et al., "Real-time Prosody-driven Synthesis of Body Language", ACM Trans. Graph., vol. 28, No. 5, article 172 (Dec. 2009).
Lu et al., "HelpingHand: Example-based Stroke Stylization", ACM Trans. on Graph., vol. 31, No. 4, article 46, pp. 46.1-46.10 (Jul. 2012).
Lukac et al., "Painting by Feature: Texture Boundaries for Example-based Image Creation", ACM Trans. Graph., vol. 32, No. 4, article 116 (Jul. 2013).
Muda et al., "Voice Recognition Algorithms Using Mel Frequency Cepstral Coefficient (MFCC) and Dynamic Time Warping (DTW) Techniques", Journal of Computing, vol. 2, issue 3, pp. 138-143 (Mar. 2010).
Pavel et al., SceneSkim: Searching and Browsing Movies Using Synchronized Captions, Scripts and Plot Summaries:, In Proceedings of the 28th Annual ACM Symposium on User Interface Software and Technology (UIST 2015), pp. 181-190 (2015).
Pavel et al., "Video Digests: A Browsable, Skimmable Format for Informational Lecture Videos", Proceedings of the 27th Annual ACM Symposium on User Interface Software and Technology (UIST 2014), pp. 573-582 (2014).
Raj et al., "Non-negative matrix factorization based compensation of music for automatic speech recognition", Proceedings of Interspeech, pp. 717-720 (2010).
Roelands et al., "Waveform Similarity Based Overlap-Add (WSOLA) for Time-Scale Modification of Speech: Structures and Evaluation", EUROSPEECH, pp. 337-340 (1993).
Sjolander, "An HMM-based system for automatic segmentation and alignment of speech", PHONUM 9, pp. 93-96 (2003).
Stone et al., "Speaking with Hands: Creating Animated Conversational Characters from Recordings of Human Performance", In AMC SIGGRAPH 2004 Papers, pp. 506-513 (2004).
Stylianou et al., "Continuous probabilistic transform for voice conversion", IEEE Transactions on Speech and Audio Processing, vol. 6, No. 2, pp. 131-142 (Mar. 1998).
Taylor, "Text-to-Speech Synthesis", Table of Contents and Introduction (31 pages), Cambridge University Press (2009).
Toda et al., "Voice Conversion Based on Maximum-Likelihood Estimation of Spectral Parameter Trajectory", IEEE Transactions on Audio, Speech, and Language Processing, vol. 15, pp. 2222-2235 (Nov. 2007).
Toda et al., "One-to-Many and Many-to-One Voice Conversion Based on Eigenvoices", In 1988 International Conference on Acoustics, Speech, and Signal Processing (ICASSP 88), vol. 4, pp. IV-1249-1252, DOI: 10.1109/ICASSP.2007.367303 (May 2007).
Toda et al., "Voice conversion algorithm based on Gaussian mixture model with dynamic frequency warping of Straight spectrum", In 2001 IEEE International Conference on Acoustics, Speech and Signal Processing (ICASSP), pp. 841-844, DOI: 10.1109/ICASSP.2001.941046 (2001).
Tokuda et al., "Speech Synthesis Based on Hidden Markov Models", Proceedings of the IEEE, vol. 101, No. 5, pp. 1234-1252, DOI 10.1109/JPROC.2013.2251852 (May 2013).
Whittaker et al., "Semantic Speech Editing", Proceedings of the SIGCHI Conference on Human Factors in Computing Systems (CHI 2004), pp. 527-534, DOI: 10.1145/985692.985759 (2004).
Wu et al., "Exemplar-based unit selection for voice conversion utilizing temporal information", Proc. Interspeech 2013, pp. 3057-3061 (2013).
Arik et al., "Deep Voice 2: Multi-Speaker Neural Text-to-Speech", in 31st Conference on Neural Information Processing Systems (NIPS 2017), Long Beach, CA, arXiv:1705.08947v2, 15 pages (Sep. 20, 2017).
Arik et al., "Neural Voice Cloning with a Few Samples", in 32nd Conference on Neural Information Processing Systems (NIPS 2018), Montréal, Canada, arXiv:1802.06006v3, 18 pages (Oct. 12, 2018).
Black et al., "Automatically clustering similar units for unit selection in speech synthesis", Proceedings of the Eurospeech 1997, Rhodes, Greece, 4 pages (1997).
Black, "Unit selection and emotional speech", Eighth European Conference on Speech Communication and Technology, 4 pages (2003).
Cheveigne et al., "YIN, A fundamental frequency estimator for speech and music", The Journal of the Acoustical Society of America, vol. 111(4), pp. 1917-1930 (Apr. 2002).
Dutoit, "Corpus-Based Speech Synthesis", Chapter 21 in Springer Handbook of Speech Processing, Springer-Verlag Berlin Heidelberg, pp. 437-455 (2008).
Hon et al., "CMU Robust Vocabulary-Independent Speech Recognition System", published in Proceedings of ICASSP 91: 1991 International Conference on Acoustics, Speech, and Signal Processing, pp. 889-892 (1991).
Jin et al., "FFTNET: A real-time speaker-dependent neural vocoder", published in 2018 IEEE International Conference on Acoustics, Speech and Signal Processing (ICASSP), 5 pages (2018).
Kawahara et al., "Restructuring speech representations using a pitch-adaptive time-frequency smoothing and an instantaneous-frequency-based F0 extraction: Possible role of a repetitive structure in sounds", Speech Communication, vol. 27, pp. 187-207 (1999).
Kawai et al., "XIMERA: A new TTS from ATR based on corpus-based technologies", in Fifth ISCA Speech Synthesis Workshop, pp. 179-184 (Jun. 14-16, 2004).
Kim et al., "Two-band excitation for hmm-based speech synthesis", in IEICE Transactions on Information and Systems, vol. E90-D, pp. 378-381 (Jan. 2007).

(56) References Cited

OTHER PUBLICATIONS

Kishore et al., "Unit size in unit selection speech synthesis", in Proceedings of the Eurospeech 2003, Geneva, Switzerland, pp. 1317-1320 (2003).
Lorenzo-Trueba et al., "The voice conversion challenge 2018: Promoting development of parallel and nonparallel methods", Odyssey 2018: The Speaker and Language Recognition Workshop, Les Sables d'Olonne, France, arXiv:1804.04262, 10 pages (2018).
Luong et al., "Effective approaches to attention-based neural machine translation", in Proceedings of the 2015 Conference on Empirical Methods in Natural Language Processing, arXiv:1508.04025v5, 11 pages (Sep. 2015).
Mason et al., "Conducting behavioral research on Amazon's Mechanical Turk", Behavior Research Methods, vol. 44(1), pp. 1-23 (2012).
Merritt et al., "Deep neural network-guided unit selection synthesis", in 2016 IEEE International Conference on Acoustics, Speech and Signal Processing (ICASSP), pp. 5145-5149 (2016).
Niwa et al., "Statistical voice conversion based on WaveNet", in Proceedings of the 2018 IEEE International Conference on Acoustics, Speech and Signal Processing (ICASSP), pp. 5289-5293 (2018).
Nose et al., "A style control technique for HMM-based expressive speech synthesis", IEICE Transactions on Information and Systems, vol. E90-D, pp. 1406-1413 (Sep. 2007).
Okubo et al., "Hybrid voice conversion of unit selection and generation using prosody dependent HMM", in IEICE Transactions on Information and Systems, vol. E89-D, pp. 2775-2782 (Nov. 2006).
Park et al., "Narrowband to wideband conversion of speech using GMM based transformation", in IEEE International Conference on Acoustics, Speech and Signal Processing (ICASSP 2000), vol. 3, pp. 1843-1846 (2000).
Patil et al., "A syllable-based framework for unit selection synthesis in 13 Indian languages", in 2013 International Conference Oriental COCOSDA held jointly with 2013 Conference on Asian Spoken Language Research and Evaluation (O-COCOSDA/CASLRE), Gurgaon, pp. 1-8 (Nov. 2013).
Schröder, "Expressive speech synthesis: Past, present, and possible futures", in Affective Information Processing, Springer London, pp. 111-126 (2009).
Shen et al., "Natural TTS synthesis by conditioning WaveNet on MEL spectrogram predictions", in 2018 IEEE International Conference on Acoustics, Speech and Signal Processing (ICASSP), arXiv:1712.05884v2, 5 pages (Feb. 16, 2017).
Stylianou, "Voice transformation: A survey", in IEEE International Conference on Acoustics, Speech and Signal Processing (ICASSP 2009), pp. 3585-3588 (2009).
Sun et al., "Phonetic posteriorgrams for many-to-one voice conversion without parallel data training", in 2016 IEEE International Conference on Multimedia and Expo (ICME), pp. 1-6 (2016).
Sündermann et al., "Text-independent voice conversion based on unit selection", in IEEE International Conference on Acoustics, Speech and Signal Processing (ICASSP 2006), pp. 81-84 (May 2006).
Sutskever et al., "Sequence to sequence learning with neural networks", in Proceedings of the 27th International Conference on Neural Information Processing Systems, arXiv:1409.3215v3, 9 pages (Dec. 14, 2014).
Tachibana et al., "Speaker and style adaptation using average voice model for style control in hmm-based speech synthesis", in 2008 IEEE International Conference on Acoustics, Speech and Signal Processing, pp. 4633-4636 (2008).
Takamichi et al., "Modulation spectrum-constrained trajectory training algorithm for GMM-based voice conversion", in IEEE International Conference on Acoustics, Speech and Signal Processing (ICASSP 2015), pp. 4859-4863 (2015).
Tan et al., "Gated residual networks with dilated convolutions for supervised speech separation", in 2018 IEEE International Conference on Acoustics, Speech and Signal Processing (ICASSP), pp. 21-25 (2018).
Tokuda et al., "Mel-generalized cepstral analysis—A unified approach to speech spectral estimation", in the 3rd International Conference on Spoken Language Processing (ICSLP 1994), Yokohama, Japan, 4 pages (1994).
Tokuda et al., "Speech parameter generation algorithms for HMM-based speech synthesis", in 2000 IEEE International Conference on Acoustics, Speech, and Signal Processing (Cat. No. 00CH37100), Istanbul, Turkey, vol. 3, pp. 1315-1318 (2000).
Wang et al., "An RNN-based quantized F0 model with multi-tier feedback links for text-to-speech synthesis", in Proceedings of Interspeech 2017, pp. 1059-1063 (2017).
Wu et al., "Deep neural networks employing multi-task learning and stacked bottleneck features for speech synthesis", in 2015 IEEE International Conference on Acoustics, Speech and Signal Processing (ICASSP), pp. 4460-4464 (2015).
Yamagishi et al., "Analysis of speaker adaptation algorithms for HMM-based speech synthesis and a constrained SMAPLR adaptation algorithm", IEEE Transactions on Audio, Speech, and Language Processing, vol. 17(1), pp. 66-83 (2009).
Yoshimura et al., "Simultaneous modeling of spectrum, pitch and duration in HMM-based speech synthesis", Eurospeech, 4 pages (1999).
Zen et al., "Statistical parametric speech synthesis using deep neural networks", in 2013 IEEE International Conference on Acoustics, Speech and Signal Processing, pp. 7962-7966 (2013).
Rubin et al., "Content-Based Tools for Editing Audio Stories", UIST 2013—Proceedings of the 26th Annual ACM Symposium on User Interface Software and Technology, DOI: 10.1145/2501988. 2501993 (Oct. 2013).

* cited by examiner

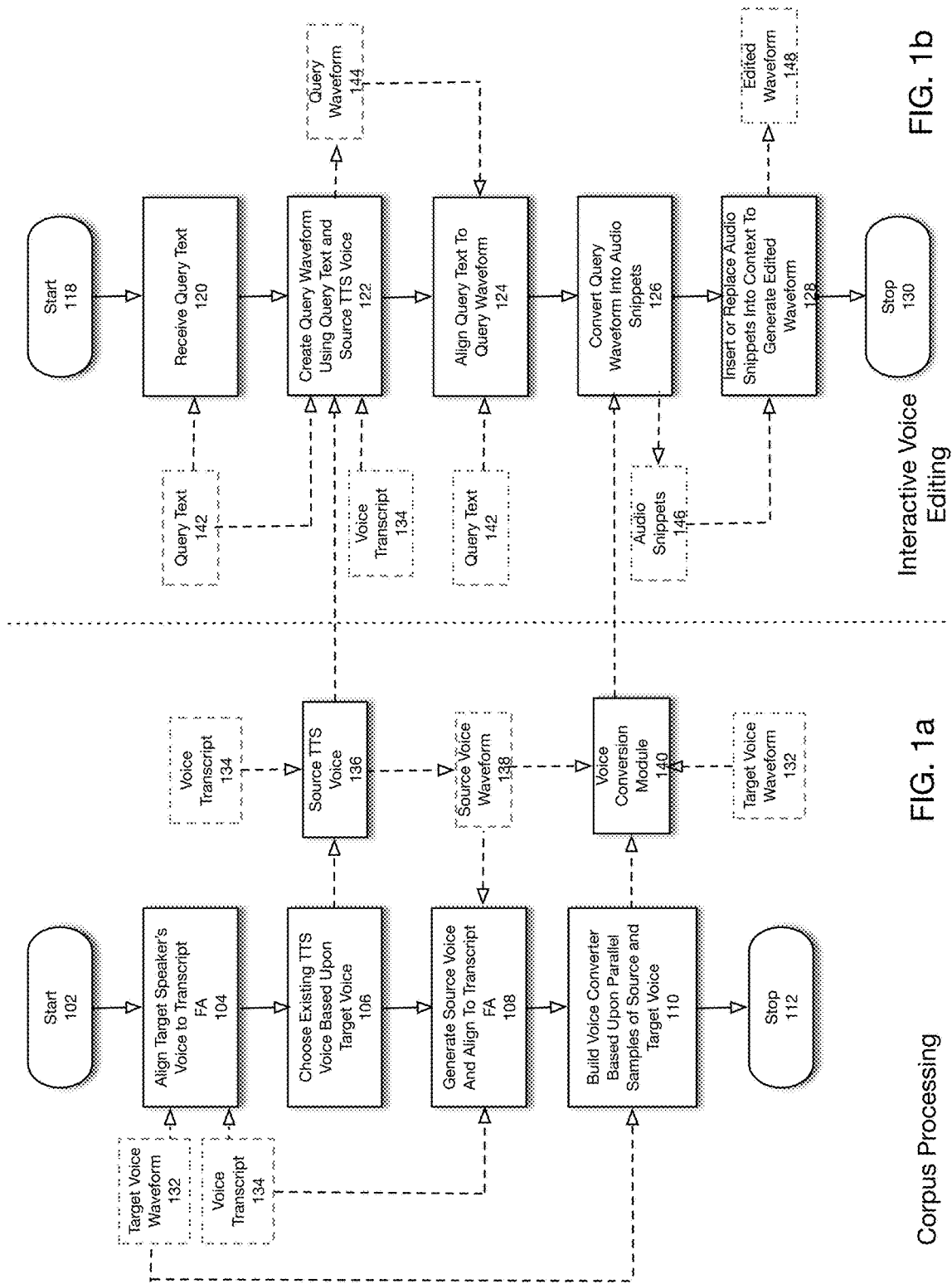

TEXT-BASED INSERTION AND REPLACEMENT IN AUDIO NARRATION

FIELD OF THE DISCLOSURE

This disclosure relates to techniques and systems for interactive text-based insertion and replacement in an audio stream or file.

BACKGROUND

Recorded audio narration plays a crucial role in many scenarios including animation, computer games, demonstration videos, documentaries, and podcasts. After narration is recorded, most of these applications require editing. Typical audio editing interfaces present a visualization of the audio waveform and provide the user with standard select, cut, copy and paste operations (in addition to low-level operations like time stretching, pitch bending, or envelope adjustment), which are applied to the waveform itself.

Such interfaces can be cumbersome, especially for non-experts. Researchers have addressed this problem by aligning the waveform with a transcript of the narration, and providing an interface wherein the user can perform cut-copy-paste operations in the text of the transcript. Editing audio narration using conventional software typically involves many painstaking low-level manipulations. Some state of the art systems allow the editor to work in a text transcript of the narration, and perform select, cut, copy and paste operations directly in the transcript; these operations are then automatically applied to the waveform in a straight-forward manner.

While cut-copy-paste operations are supported, one aspect remains conspicuously missing from text-based audio editors: insertion and replacement. In many circumstances inserting or replacing a new word or phrase during editing would be useful, for example replacing a misspoken word or inserting an adjective for emphasis. While it is easy for a person to type a new word not appearing in the transcript, it is not obvious how to synthesize the corresponding audio. The challenge is to synthesize the new word in a voice that matches the rest of the narration.

It is possible to record new audio of just the missing word, but to do so requires access to the original voice talent. Moreover, even when the original narrator, microphone and acoustic environment are available for a new recording, it remains difficult to match the audio quality of an inserted word or phrase to the context around it. Thus, an insertion or replacement is often evident in the edited audio. Regardless, just as it is easier to type than to edit audio waveforms for cut and paste operations, it is also easier to type for insertion or replacement rather than record new audio.

Voice conversion ("VC") refers to any algorithm for making an utterance of one person sound as if it were made by another. Approaches to VC typically rely on a training set of parallel utterances spoken by both the source and target. State of the art parametric methods then explicitly model a conversion function mapping from the source to the target in some feature space such as MFCC ("Mel Frequency Cepstral Coefficients") or STRAIGHT. A new source utterance (the query) may be transformed into the feature space and then mapped through the conversion function to match the target. The output of such parametric methods must be re-synthesized from these features, and artifacts are inevitable since these feature spaces do not perfectly model human voice. Thus, the converted speech usually has a muffled effect as a result of re-synthesis.

In order to avoid artifacts due to re-synthesis, an alternative to the parametric approach relies on a technique referred to as "unit selection". The basic idea of unit selection is to choose segments of the target speaker's training samples whose corresponding source samples sound like the query, while also seeking smooth transitions between neighboring segments. Modern text-to-speech synthesis systems demonstrate that unit selection can generate high quality speech with high individuality, which is crucial for VC. These systems require very large training sets (many hours up to days) as well as substantial human annotation. Yet, in typical VC applications, there exists a limited training set (e.g., 1 hour) and no manual effort is possible.

Thus, although VC systems are known, to provide practical text based insertion and replacement interactively in an audio narration using a technique such as unit selection requires several key improvements. First, a VC algorithm must be highly optimized so that it is fast enough to allow for an interactive experience. Second, the VC algorithm must provide high quality converted speech.

BRIEF DESCRIPTION OF THE DRAWINGS

FIG. 1a is a flowchart showing a corpus processing process for voice according to one embodiment of the present disclosure.

FIG. 1b is a flowchart depicting an interactive voice editing process according to one embodiment of the present disclosure.

DETAILED DESCRIPTION

Figure 1C:
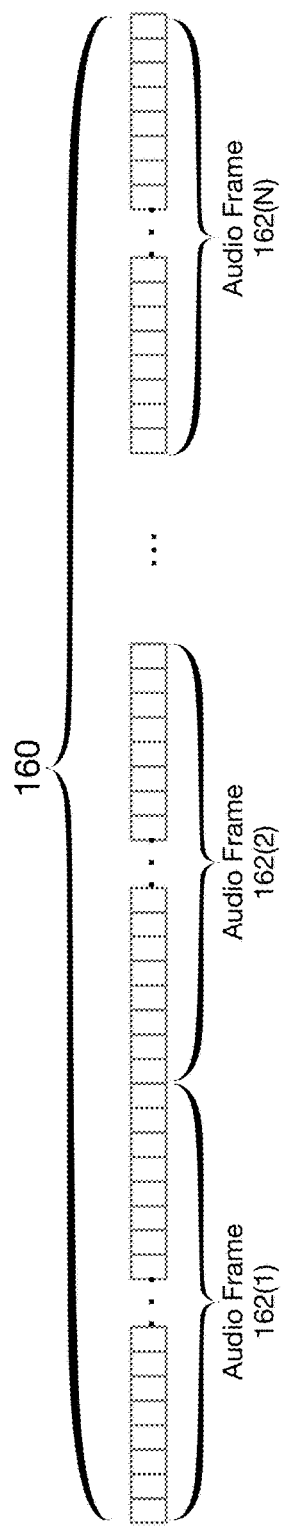
FIG. 1c shows an example structure of a speech audio waveform according to one embodiment of the present disclosure.

The present disclosure describes an optimized voice conversion ("VC") algorithm and editing system. According to some embodiments, the VC algorithm is based upon unit selection that solves or otherwise addresses the various problems noted above. In particular, the present disclosure describes example systems and techniques for synthesizing a new word or short phrase such that it blends seamlessly in the context of insertion or replacement in an existing narration, according to some embodiments.

The system improves VC synthesis quality by utilizing a method referred to as "range selection" instead of frame-level unit selection, which is utilized in known approaches. To improve the optimization speed to support an interactive environment, the system provides a two-stage optimization process: (i) dynamic programming is utilized to select phoneme 152 sequences; (ii) upon selection of the phoneme 152 sequences, range selection is utilized to choose audio frames that match the selected phoneme 152 sequences.

Further, the system utilizes a technique referred to herein as "exchangeable triphones" to achieve clarity with a smaller corpus (20-40 minutes) than known methods. The system optimizes matching the context of the insertion. Further, for cases where the default output is unsatisfactory in quality or prosody, the system supports interfaces to allow novices and/or experts to improve the results by choosing among a variety of alternative versions of the synthesized word, adjusting the edit boundaries and pitch profiles of the concatenated audio clips and adjusting the synthesis using the editor's own voice.

As will be described herein, an interactive voice editing system further comprises a corpus processing engine and interactive voice editing module, which collectively provide for interactive replacement and insertion of words or phrases in an existing audio narration.

Further, according to one embodiment, an editor and interface are described that support fully automatic synthesis, selection among a candidate set of alternative pronunciations, fine control over edit placements and pitch profiles, and guidance by the editor's own voice. The techniques described herein provide significantly higher quality output than conventional methods that is often indistinguishable from the original voice.

FIG. 1a is a flowchart showing a corpus processing process for voice according to one embodiment of the present disclosure. The process shown in FIG. 1a may be implemented on a corpus processing engine (described below). The corpus processing phase receives as inputs voice transcript 134, target voice waveform 132 and source voice waveform 138 and generates as outputs voice conversion module 140 and source TTS voice 136. Target voice waveform 132 may be an audio waveform of speech. For example, target voice waveform 132 may be a digital representation of a speech signal. Target voice waveform 132 may utilize any representation for digital audio such as PCM ("Pulse Code Modulation"), etc. The audio waveform may be sampled at various rates including, for example, 8 KHz, 16, KHz, 24 KHz, 32 KHz, 44.1 KHz, 48 KHz, etc.

Voice transcript 134 may be a textual transcript of a speech signal corresponding to target voice waveform 132. That is, voice transcript 134 may contains a textual transcription of the speech signal codified in target voice waveform 132.

A user or editor utilizing an interactive voice editing system (described below) may desire to modify target voice waveform 132 to insert or replace textual elements such as words or phrases using a text editor or other interface for editing text, thereby modifying voice transcript 134.

As will be understood, human speech comprises an ordered sequence of phonemes 152, which are building blocks or audio units of an audio speech signal. Phonemes 152 may be symbolized with Roman letters inside slash marks, for example, /t/. The list of phonemes 152 contains consonants, vowels, digraphs (a combination of two letters representing one sound) and grapheme (the smallest meaningful contrastive unit in a writing system). For example:

cat has 3 phonemes—(/k/a/t/)
cream has 4 phonemes—(/k/r/ē/m/)
submarine has 8 phonemes—(/s/u/b/m/a/r/i/n/)

A corpus processing process will now be described. The process is initiated in 102. In 104, target voice waveform 132 is aligned to voice transcript 134 using the phonemes 152 of speech in target voice waveform 132 and correspondingly represented in voice transcript 134.

According to one embodiment of the present disclosure, a forced alignment method or other alignment method may be utilized to align target voice waveform 132 with voice transcript 134. In particular, the text comprising voice transcript 134 may be converted into phoneme representation data (a phonetic representation) that may then be correlated temporally to the actual phonemes 152 in target voice waveform 132. In other words, the phonemes 152 in target voice waveform 132 may be matched to the phoneme 152 symbols from the text in voice transcript 134. In particular, and as described in more detail below, the output of a forced alignment process in 104 may be a phoneme alignment map that represents a temporal mapping of the audio portions of target voice waveform 132 to particular phoneme 152 symbols associated with the words in voice transcript 134. Details of a forced alignment method are described below.

In 106, a repository of synthetic TTS voices is then analyzed to determine an optimal TTS voice that closely matches target voice waveform 132. This optimal TTS voice is herein referred to as the source TTS voice 136. It will be understood that source TTS voice 136 represents an optimal TTS voice from a set of TTS voices that may be stored, for example, in a repository. The optimal TTS voice refers to a TTS voice that sonically resembles the target voice waveform 132 as closely as possible in terms of timbre, prosody and other attributes of speech.

According to one embodiment of the present disclosure, in order to determine source TTS voice 136, an acoustic difference may be computed between each of an existing set of TTS voices in a repository and target voice waveform 132 utilizing a distance metric. According to one embodiment of the present disclosure, Mel-Cepstral distortion ("MCD") may be utilized as a metric to determine the similarity of target voice waveform 132 and a set of TTS voices to determine source TTS voice 136. Details relating to MCD are described below. However, for purposes of the present discussion, it is sufficient to recognize that MCD measures a spectral difference between two audio waveforms. The TTS voice having the lowest MCD difference with target voice waveform 132 may then be selected as the optimal TTS voice and therefore may be used to serve as source TTS voice 136.

According to one embodiment of the present disclosure, in 108, source TTS voice 136 is used to read voice transcript 134 to generate source voice waveform 138 and then align source voice waveform 138 to voice transcript 134. Similar to 104, a forced alignment method may be utilized to align source voice waveform 138 and voice transcript 134.

In 110, voice conversion module 140 is generated based upon parallel samples of the generated source voice waveform 138 and target voice waveform 132. Details of a process for generating a voice converter are described below with respect to FIGS. 3a-3b. In addition, the structure of voice conversion module 140 is described below. The process ends in 112.

FIG. 1b is a flowchart depicting an interactive voice editing process according to one embodiment of the present disclosure. The interactive voice editing process shown in FIG. 1b is designed to allow a user to edit a speech waveform in an interactive manner by providing textual input relating to insertions or replacement of speech in an interactive manner. With respect to the process shown in FIG. 1b, it is understood that a user/editor desires to modify voice transcript 134 either by inserting or replacing various words such that corresponding target voice waveform 132 is modified so that that the speech signals in target voice waveform 132 correspond to the modified voice transcript 134. That is, any text that is inserted or replaced in voice transcript 134 should result in the audio of target voice waveform 132 reflecting those changes in a transparent manner that does not reveal the speech signals contained have been modified.

The process is initiated in 118. In 120, query text is 142 received. Query text 142 may be any textual input the user desires to insert or replace as spoken voice in target voice waveform 132 and corresponding to voice transcript 134. For example, assume that target voice waveform 132 and voice transcript 134 comprise the sentence "Let's meet for dinner next Tuesday evening." Assume further, for purposes of this example, that a user/editor desires to modify target voice waveform 132 that originally recites:

"Let's meet for dinner next Tuesday evening."

In this instance, the user might wish to replace the word "Tuesday" with "Thursday" and thus the query text 142 might be the word "Thursday" so that the spoken words are:

"Let's meet for dinner next Thursday evening."

The query text 142 may be received via a user interface in which a user types text to be inserted or replaced in target voice waveform 132. However, other possible user interfaces are possible.

In 122, query waveform 144 is generated using source TTS voice 136, voice transcript 134 and query text 142. In particular, according to one embodiment, source TTS voice 136 is used to generate query waveform 144 based upon query text 142. In particular, according to one embodiment of the present disclosure, source TTS voice 136 is used to speak query text 142 to generate query waveform 144.

According to an alternative embodiment, voice transcript 134 may also be utilized in generating query waveform 144. In particular, in addition to having source TTS voice 136 speak only query text 142, some portion of text in voice transcript 134 that surround or enclose query text 142 may be utilized in conjunction with query text 142 to generate query waveform 144. For example, using the previous example in which target voice waveform 132 recites the text "Let's meeting for dinner next Tuesday evening" in which a user wishes to replace the word "Tuesday" with "Thursday", rather than utilizing source TTS voice 136 only to synthesize the word "Thursday", some portion of text enclosing the word "Tuesday" from the original voice transcript 134 may also be synthesized. For example, source TTS voice 136 may synthesize the text "dinner next evening" since the words "dinner next" and "evening" surround the word "Tuesday", which the word "Thursday" is to replace.

In 124, query text 142 and query waveform 144 are aligned using, for example, a forced alignment method. In 126, voice conversion module 140 generated in 110 is utilized to convert query waveform 144 into audio snippets 146. The meaning of audio snippets 146 will be described below. For purposes of the present discussion, it is sufficient to recognize that audio snippet 146 refers to any portion of audio frames 162. In 128, audio snippets 146 generated in 128 are converted to an edited waveform 148 that represents a modification of target voice waveform 132 with the modifications associated with query text 142. The process ends in 130.

FIG. 1c shows an example structure of a speech audio waveform according to one embodiment of the present disclosure. Speech audio waveform 160 may, for example, be target voice waveform 132 or source voice waveform 138. As shown in FIG. 1c, speech audio waveform 160 may comprise an ordered sequence of audio samples (symbolized by the blocks in FIG. 1c). Portions of speech waveform 160 may be further subdivided into an arbitrary number of audio frames 162(1)-162(N). Each audio frame 162(1)-162(N) comprises a number of audio samples.

Figure 1D:
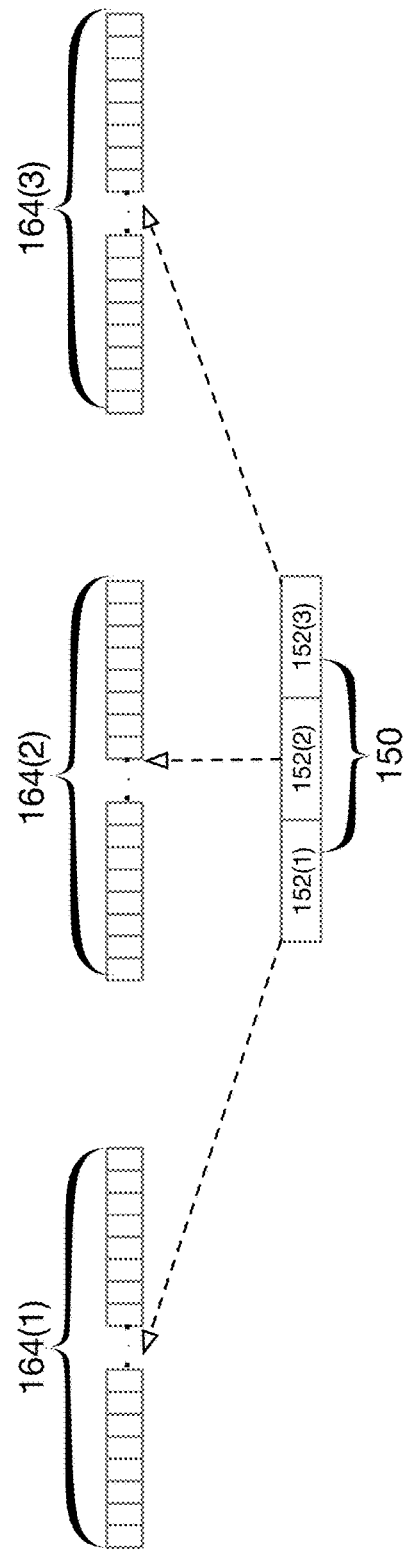
FIG. 1d depicts an audio segment according to one embodiment of the present disclosure.

FIG. 1d depicts an audio segment according to one embodiment of the present disclosure. As used herein, a segment 164 refers to a set of speech samples corresponding to (i.e., spanning) a particular phoneme 152. Thus, as shown in FIG. 1d triphone 150 comprising the three phonemes 152(1), 152(2) and 152(3) is associated with three segments 164(1), 164(2) and 164(3). In particular, phoneme 152(1) corresponds to segment 164(1), phoneme 152(2) corresponds to segment 164(2) and phoneme 152(3) corresponds to segment 164(3).

Figure 2:
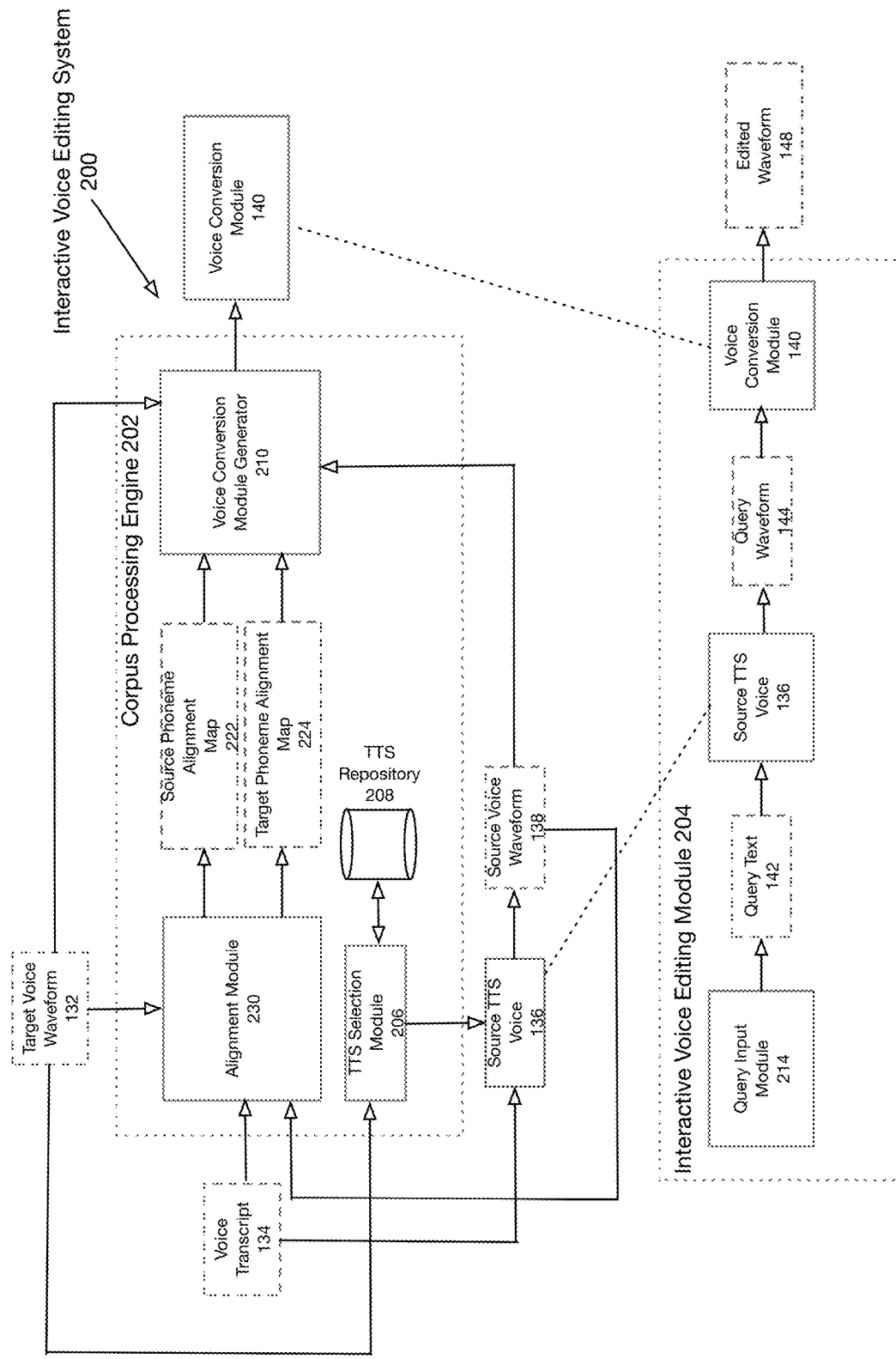
FIG. 2 is a block diagram of an interactive voice editing system according to one embodiment of the present disclosure.

FIG. 2 is a block diagram of an interactive voice editing system according to one embodiment of the present disclosure. As shown in FIG. 2, interactive voice editing system further comprises corpus processing engine 202 and interactive voice editing module 204. Corpus processing engine 202 may perform processing of pre-recorded speech, in particular target voice waveform 132, for preparation for interactive editing via interactive voice editing module 204. In particular, a user using interactive voice editing system 200 may desire to perform interactive voice editing of target voice waveform 132 using a text editor to indicate the insertion or replacement of portions of text in associated voice transcript 134.

As shown in FIG. 2, corpus processing engine 202 may further comprise alignment module 230, TTS selection module 206, TTS repository 208 and voice conversion module generator 210. Interactive voice editing system 200 may receive target voice waveform 132 and voice transcript 134 as input. And, as further described below, interactive voice editing system 200 may generate source TTS voice 136 and voice conversion module 140 as output, which are utilized by interactive voice editing module 204 to enable interactive voice editing.

In particular, target voice waveform 132 and voice transcript 134 may be received at alignment module 230. Alignment module 230 may perform a forced alignment process to align target voice waveform 132 to voice transcript 134. Alignment module 230 may then generate target phoneme alignment map 224 based upon target voice waveform 132 and voice transcript 134. As will be described in detail below, target phoneme alignment map 224 may comprise a mapping between phonemes 152 in voice transcript 134 and temporal events in which particular phonemes 152 occur in target voice waveform 132.

Although FIG. 2 shows query input module 214, source TTS voice 136 and voice conversion module 140 as separate entities, it will be understood that other arrangements and combinations are possible. For example, according to some embodiments of the present disclosure, voice conversion module 140 contains one or both of query input module 214 and source TTS voice 136.

Forced Alignment

As previously described, alignment module 230 may be a forced alignment module. For purposes of the present discussion, it is assumed that alignment module 230 utilizes a forced alignment method. However, it will be understood that other methods are possible. The operation of a forced alignment module 230 will now be briefly described. According to one embodiment of the present disclosure, alignment module 230 processes voice transcript 134 and source voice waveform 138 and target voice waveform 132 to generate source phoneme alignment map 222 and target phoneme alignment map 224 respectively, each of which comprise a mapping of phoneme labels in voice transcript 134 to temporal regions of either source voice waveform 138 or target voice waveform 132. The process of forced alignment will be well understood. According to one embodiment a P2FA forced alignment module is utilized. The inputs to a forced alignment module (e.g., 230) may be both a sequence of phonemes and an audio waveform. According to one embodiment, an output generated by a forced alignment module (e.g., 230) may be a sequence of timestamps indicating when each phoneme begins and ends.

Also, as shown in FIG. 2, target voice waveform 132 is also provided to TTS selection module 206. As will be described in detail below, TTS selection module 206 may determine an optimal TTS voice stored in TTS repository 208 that most closely matches target voice waveform 132. For example, TTS selection module 206 may perform an optimization process utilizing a cost function or distance metric (e.g., MCD) that characterizes the distance between target voice waveform 132 and voice waveforms generated by respective TTS voices in TTS repository 208. TTS selection module 206 may then select the optimal TTS voice, which is referred to herein as source TTS voice 136.

Source TTS voice 136 may then process voice transcript 134 to generate source voice waveform 138. In particular, source TTS voice 136 may simply "read" voice transcript 134 to generate source voice waveform 138.

Source voice waveform 138 is then provided to alignment module 230, which alignment module 230 utilizes in conjunction with voice transcript 134 to generate source phoneme alignment map 222. Source phoneme alignment map 222 embodies a similar structure to target phoneme alignment map 224, except for the fact that it characterizes the temporal alignment of phonemes 152 occurring in source voice waveform 138 and their representation in voice transcript 134.

Source phoneme alignment map 222 and target phoneme alignment map 224 are provided to voice conversion module generator 210, which generates voice conversion module 140. As will become evident as described herein, voice conversion module 140 is utilized by interactive voice editing module 204 to perform a voice conversion based upon received query text 142 that indicates words or phrases to be inserted or replaced in voice transcript 134.

Once corpus processing engine 202 generates source TTS voice 136 and voice conversion module 140, these components may be utilized by interactive voice editing module 204 to enable interactive voice editing. As shown in FIG. 2, a user may desire to replace or insert particular words or phrases in voice transcript 134 and have those modifications result in the modification of target voice waveform 132 to reflect those textual changes.

Query input module 214 may provide a graphical user interface ("GUI") and user experience ("UX") to allow a user to indicate textual modifications of voice transcript 134 to be performed. The indicated textual modifications are reflected in query text 142, which may, for example, indicate particular words or phrases to be inserted or replaced. Query text 142 may be further processed to further include contextual information relating to surrounding words in the sentence. Query text 142 may then be provided to source TTS voice 136, which generates as output query waveform 144. In particular, query waveform 144 may simply comprise a "reading" of query text 142 by source TTS voice 136. Query waveform 144 is then provided to voice conversion module 140, which utilizes query waveform 144 to generate edited waveform 148. Edited waveform 148 comprises an audio waveform, which is a modification of target voice waveform 132 to reflect the insertions or replacements in voice transcript 134 indicated by query text 142.

Figure 3A:
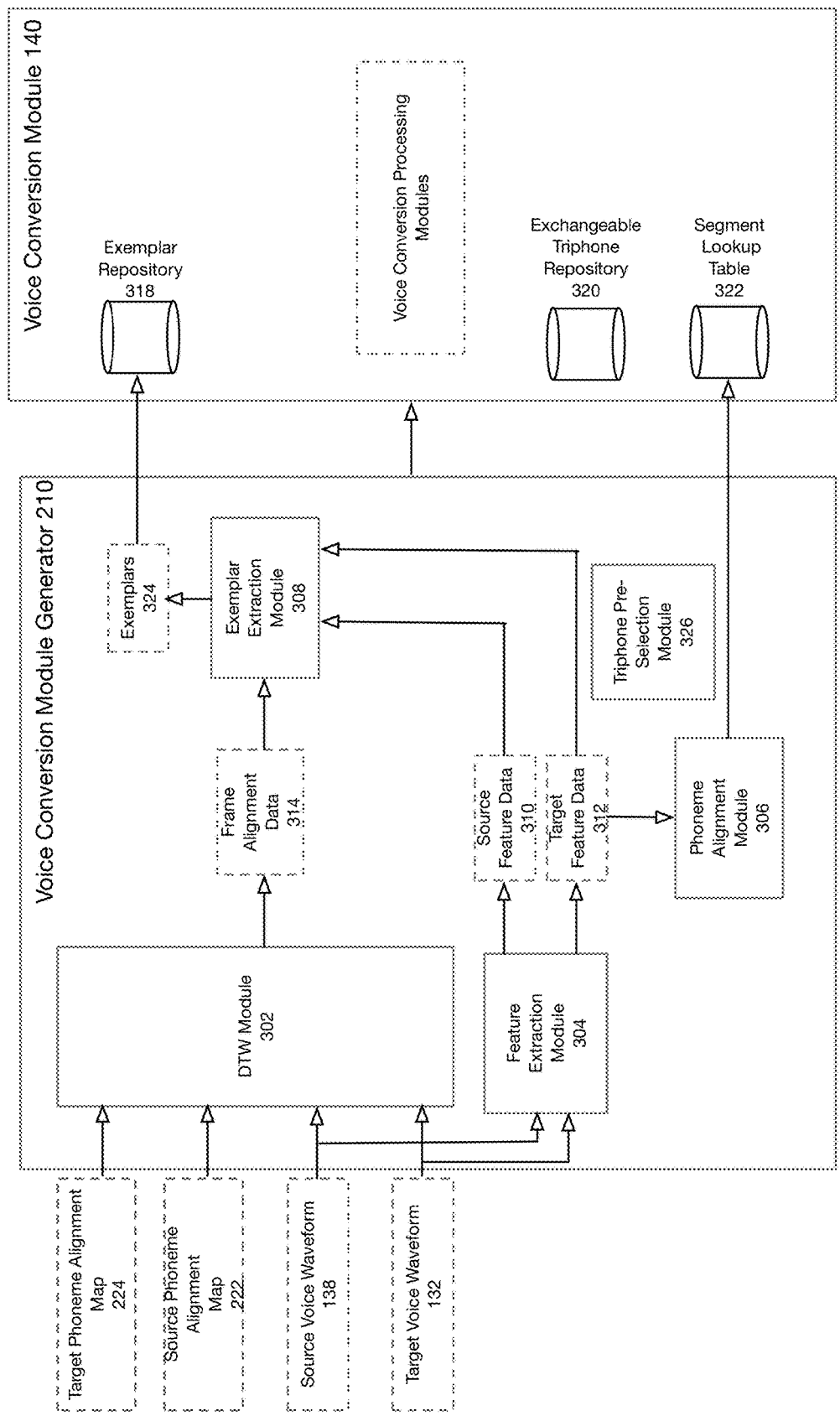
FIG. 3a is a block diagram of the structure of a voice conversion module generator according to one embodiment of the present disclosure.

FIG. 3a is a block diagram of the structure of a voice conversion module generator according to one embodiment of the present disclosure. As shown in FIG. 3a, voice conversion module generator 210 receives as input target phoneme alignment map 224, source phoneme alignment map 222, source voice waveform 138 and target voice waveform 132. Voice conversion module generator 210 generates as output voice conversion module 140.

According to one embodiment of the present disclosure, voice conversion module generator 210 may comprise DTW module 302, feature extraction module 304, phoneme alignment module 306, exemplar extraction module 308, and triphone pre-selection module 326.

DTW module 302 may receive source voice waveform 138, target voice waveform 132, source phoneme alignment map 222 and target phoneme alignment map 224 and generate as output frame alignment data 314, which is provided to exemplar extraction module 308. The format of frame alignment data 314 is described below with respect to FIG. 3b and specifically element 404. For purposes of the present discussion, it is sufficient to recognize that frame alignment data 314 may comprise a mapping between source voice waveform 138 frames and target voice waveform 132 frames. According to one embodiment of the present disclosure, frame alignment data 314 (output of DTW module 302) may comprise a map indicating a correspondence between audio frames 162 of source voice waveform 138 and target voice waveform 132.

Source voice waveform 138 and target waveform 120 are also provided to feature extraction module 304, which generates as outputs, respectively, source feature data 310 and target feature data 312, which are also provided as input to exemplar extraction module 308. Source feature data 310 and target feature data 312 may comprise any data representing features characterizing respectively source voice waveform 138 and target voice waveform 132. According to one embodiment of the present disclosure, two particular types of features are extracted from source voice waveform 138 and target voice waveform 132, MFCC and F0.

As will be understood, in sound processing, the mel-frequency cepstrum ("MFC") is a representation of the short-term power spectrum of a sound, based on a linear cosine transform of a log power spectrum on a nonlinear mel scale of frequency. Mel-frequency cepstral coefficients (MFCCs) are coefficients that collectively make up an MFC. They may be derived from a type of cepstral representation of the audio clip (a nonlinear "spectrum-of-spectrum"). The difference between the cepstrum and the mel-frequency cepstrum is that in the MFC, the frequency bands are equally spaced on the mel scale, which approximates the human auditory system's response more closely than the linearly-spaced frequency bands used in the normal cepstrum. This frequency warping can allow for better representation of sound, for example, in audio compression.

MFCCs are commonly derived as follows:
(1) Take the Fourier transform of (a windowed excerpt of) a signal;
(2) Map the powers of the spectrum obtained above onto the mel scale, using triangular overlapping windows;
(3) Take the logs of the powers at each of the mel frequencies;
(4) Take the discrete cosine transform ("DCT") of the list of mel log powers, as if it were a signal;
(5) The MFCCs are the amplitudes of the resulting spectrum.

There can be variations on this process, for example: differences in the shape or spacing of the windows used to map the scale, or addition of dynamics features such as "delta" and "delta-delta" (first- and second-order frame-to-frame difference) coefficients.

Based upon frame alignment data 314, source feature data 310 and target feature data 312, exemplar extraction module 308 generates exemplars 324, which are stored in exemplar repository 318. The meaning of exemplars 324 will be described below with respect to FIG. 3b. For purposes of the present discussion, it is sufficient to understand that exemplars 324 may represent a concatenation of features of source voice waveform 138 and target voice waveform 132.

Voice Converter Generation

Figure 3B:
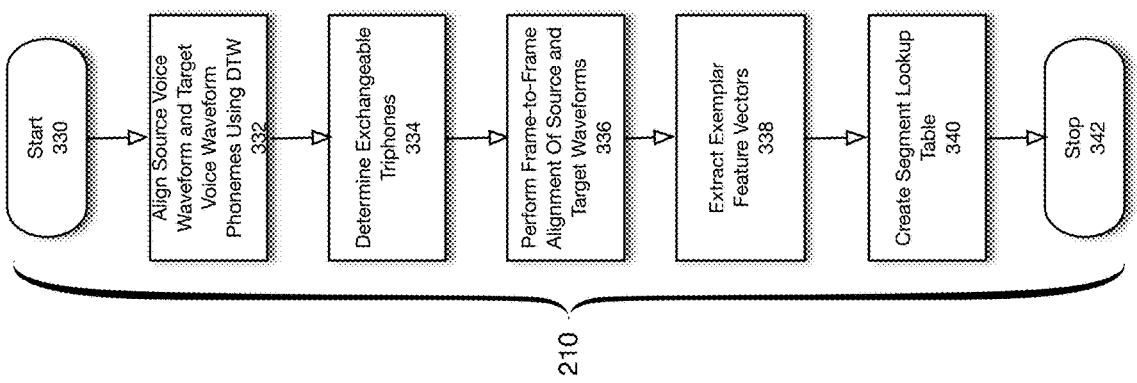
FIG. 3b is a flowchart showing a detailed process for building a voice converter based upon parallel samples of a source and target voice waveform according to one embodiment of the present disclosure.

FIG. 3b is a flowchart showing a detailed process for building a voice converter based upon parallel samples of a source and target voice waveform according to one embodiment of the present disclosure. The process shown in FIG. 3b may be performed by voice conversion module generator 210 shown in FIG. 3a.

Dynamic Time Warping (DTW)

The process is initiated in 330. In 332, source voice waveform 138 and target voice waveform 132 are aligned using dynamic time warping (DTW) (via DTW module 302) to generate frame alignment data 314. As described above, a frame will be understood to comprise a contiguous set of audio samples in the time domain.

Figure 3C:
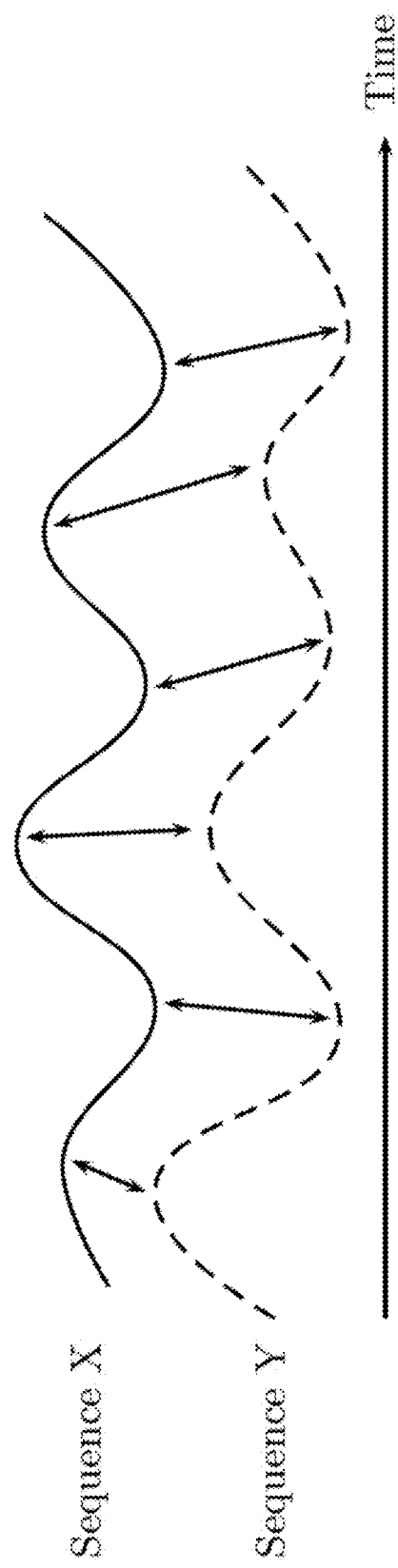
FIG. 3c depicts an example of dynamic time warping (DTW) according to one embodiment of the present disclosure.

FIG. 3c depicts an example of DTW according to one embodiment of the present disclosure. According to one embodiment of the present disclosure DTW may be performed using the source frame sequence $X=\{x_1, x_2, \ldots, x_N\}$ and the target speaker's frame sequence $Y=\{y_1, y_2, \ldots, y_N\}$, both in the time domain. Dynamic time warping (DTW) is well-known and is briefly described as follows. In time series analysis, DTW is an algorithm for measuring similarity between two temporal sequences which may vary in speed. DTW may calculate an optimal match between two sequences (e.g. time series) with certain restrictions. The sequences are "warped" non-linearly in the time dimension to determine a measure of their similarity independent of certain non-linear variations in the time dimension. Two original sequences $X_{orig}$, $Y_{orig}$ may be aligned in time by performing a transformation $X_{orig} \rightarrow X_{warped}$.

An (N, M)-warping path $p=(p_1, \ldots, p_L)$ defines an alignment between two sequences $X=(x_1, x_2, \ldots, x_N)$ and $Y=(y_1, y_2, \ldots, y_N)$ by assigning the element $x_{n_l}$ of X to the element $y_{m_l}$ of Y. Furthermore, boundary conditions may be imposed such the first and last elements of X correspond respectively to the first and last elements of Y. Further, it will be understood that a monotonicity condition and step-size condition may also be imposed, which are not discussed herein.

According to one embodiment of the present disclosure, DTW may utilize a Euclidean distance metric based upon the MFCC ("Mel Frequency Cepstral Coefficients") features of each frame.

Exchangeable Triphones

In 334, exchangeable triphones are determined. According to one embodiment of the present disclosure, a process herein referred to as exchangeable triphones will now be described. As used herein, the term exchangeable triphone refers to performing a matching process in which similar triphones 150 that lead to only slightly different pronunciation are utilized if triphone 150 matching fails rather than falling back on diphone or even phoneme matching. The searchable space of exchangeable triphones is generally a much smaller search space than the space of diphones.

According to one embodiment, triphones 150 may be exchangeable based upon whether the triphones 150 originate from different pronunciations of the same word, which is referred to as word-based exchangeable triphones. Word-based exchangeable triphones may originate from a word-to-phoneme dictionary. Some of the triphones 150 in a word may be exchangeable because alternative pronunciation of the word exists. For example, the word "this" has two pronunciations, CH_IH1_S and DH_AH0_S in the dictionary. In this instance, when a triphone 150 search is conducted, both such triphones 150 will be accepted as a valid match.

Alternatively, triphones 150 may be exchangeable based upon accent. Accent exchangeable triphones 150 are not defined in dictionaries, but rather are discovered via a phoneme alignment component of the DTW-based source to target alignment process (described below). According to one embodiment of the present disclosure, during that process cases where the source tends to utter one triphone 150 whereas the target utters a different triphone 150 when saying the same text are detected. Similar to word-based exchangeable triphones, matches between these triphones 150 may then be allowed when searching a corpus. This allows for a target speaker with a particular accent to be better matched with a more generic source TTS voice 136. An example illustrating accent exchangeable triphones is described below with respect to FIG. 3d.

Exemplar Frame

In 336, frame-to-frame alignment of source voice waveform 138 and target voice waveform 132 is performed to generate exemplar frames.

For purposes of this discussion, an exemplar frame is defined as two parallel sequences of source and target frames with the central frame aligned. With a central frame ($x_{n_k}$, $y_{m_k}$), an exemplar frame is defined as:

$$\begin{pmatrix} x_{n_k-t} & \cdots & x_{n_k-1} & x_{n_k} & x_{n_k+1} & \cdots & x_{n_k+t} \\ y_{m_k-t} & y_{m_k-t} & y_{m_k-1} & y_{m_k} & y_{m_k+1} & y_{m_k+1} & y_{m_k+t} \end{pmatrix}$$

Exemplar Feature Extraction

In 338, exemplar features are extracted. An exemplar 324 as defined as a concatenation of the weighted features of the member frames. For example, suppose a parallel frame ($x_{n_k}$, $y_{m_k}$) has feature vector $f_{n_k m_k}$, then an exemplar is:

$$[\omega_{-t} f_{n_k-t, m_k-t}, \ldots, \omega_0 f_{n_k, m_k}, \ldots, \omega_t f_{n_k+t, m_k+t}]^T$$

The weights $\omega_{-t:-t}$ are used to attenuate the influence of non-central frames, emphasizing the central frame. According to one embodiment, a triangular-shaped window function may be used for weights:

$$\omega_i = \left( \frac{t - |i| + 1}{t + 1} \right)^\beta$$

The parameter $\beta$ may be utilized to control the amount of attenuation—the higher the value, the less emphasis on the non-central frames. An exemplar provides better temporal resolution than a large frame, which facilitates the modelling of transitions between phonemes 152. Using exemplars 324 in unit selection also improves smoothness because similar examples share similar contexts. In particular, when concatenating these frames together using overlap-add, the overlapping region is likely to produce fewer artifacts. According to one embodiment of the present disclosure $\beta=1$ (triangular function).

According to embodiments of the present disclosure, two sets of exemplars 324 may be generated: (1) matching exemplars 324, which comprise the MFCCs of source frames concatenated with the target frames' F0 (in log space), denoted as $\{A_1, \ldots A_K\}$; and (2) concatenation exemplars 324, which comprise the concatenation of the MFCCs and the F0 of the target frames, denoted as $\{B_1, \ldots B_K\}$. The matching exemplars 324 may be utilized to match the spectral envelope and prosody of the query. The concatenation exemplars 324 may be utilized to enforce transition smoothness between selected frames.

In 340, a segment lookup table 322 is generated that maps each triphone 150 to all segments 164 in the target voice waveform 132 corresponding to the middle phoneme 152 in the triphone 150. That is, for each triphone 150 from voice transcript 134, the phoneme 152 occupying the middle of the triphone 150 is utilized to determine all segments 164 that match that phoneme 152. The process ends in 342.

Figure 3D:
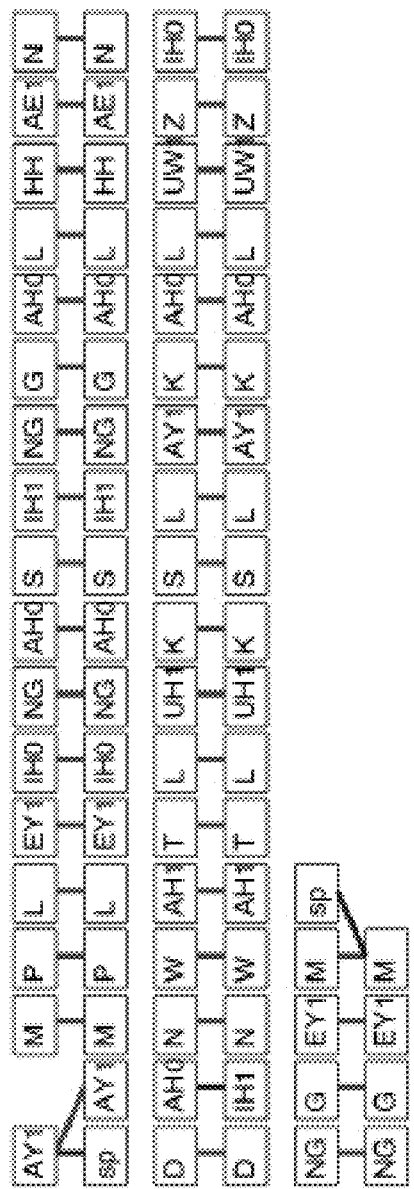
FIG. 3d depicts an example of alignment of two phoneme sequences (source above and target below) for determining exchangeable triphones according to one embodiment of the present disclosure.

FIG. 3d depicts an example of alignment of two phoneme sequences (source above and target below) for determining exchangeable triphones according to one embodiment of the present disclosure.

TTS Selection and Preparation

Figure 4:
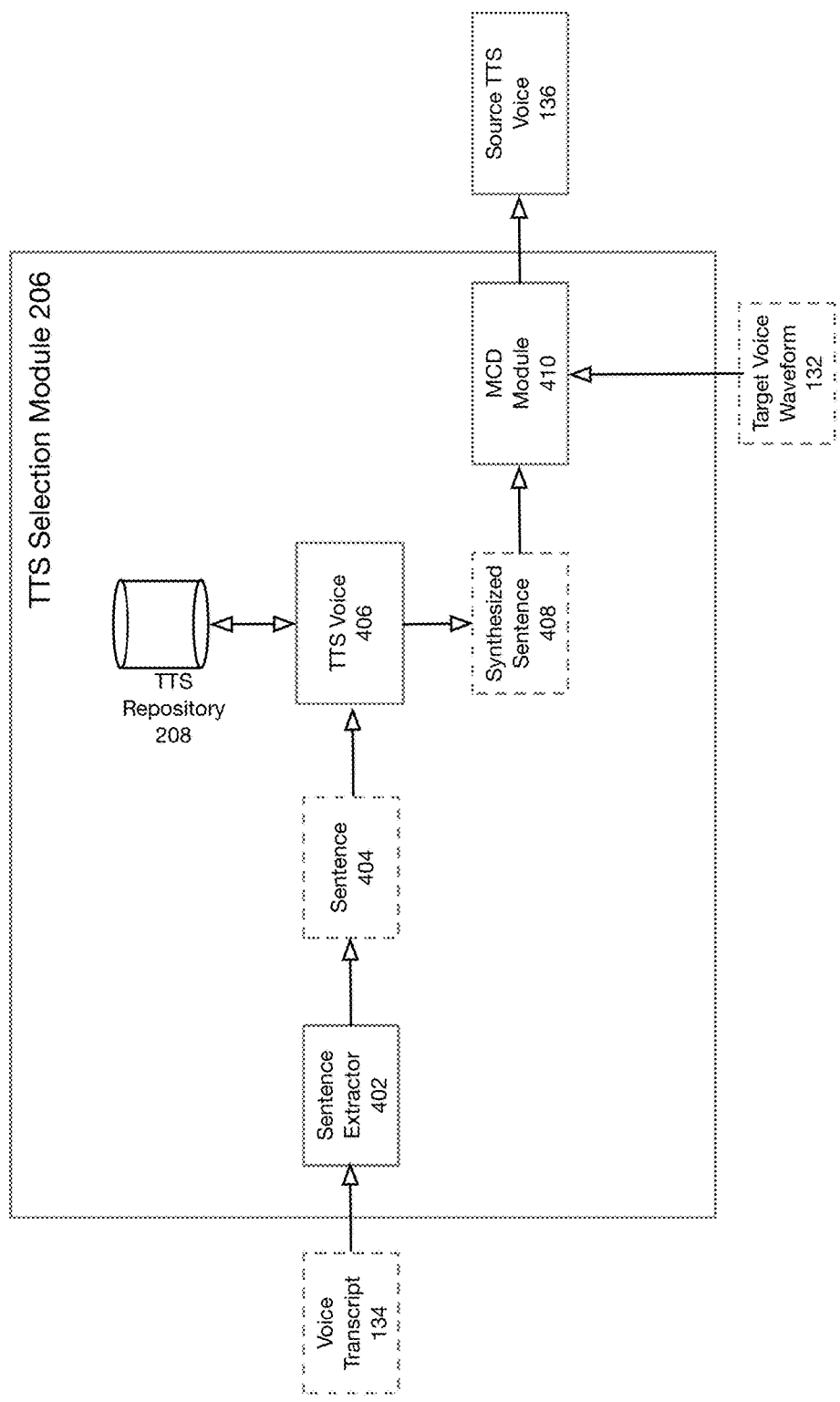
FIG. 4 is a block diagram showing of a TTS selection module according to one embodiment of the present disclosure.

FIG. 4 is a block diagram showing of a TTS selection module according to one embodiment of the present disclosure. As shown in FIG. 4, TTS selection module 206 may receive as input voice transcript 134 and target voice waveform 132 and output source TTS voice 136. As previously described, source TTS voice 136 may represent an optimal TTS voice with respect to a distance metric such as a Euclidean distance.

Referring to FIG. 4, voice transcript 134 is processed by sentence extractor 402 to generate a representative sentence 404 or sentences to be used for analysis. A TTS voice 406 for analysis is then retrieved from TTS repository 208, which is then used to process sentence 404 to generate synthesized sentence 408. Synthesized sentence 408 is then provided to MCD module 410 which analyzes synthesized sentence 408 with respect to target voice waveform 132 to compute a distance metric. Based upon a similar analysis for all TTS voices in TTS repository 208, an optimal TTS voice minimizing the distance metric is selected as source TTS voice 136.

Figure 5A:
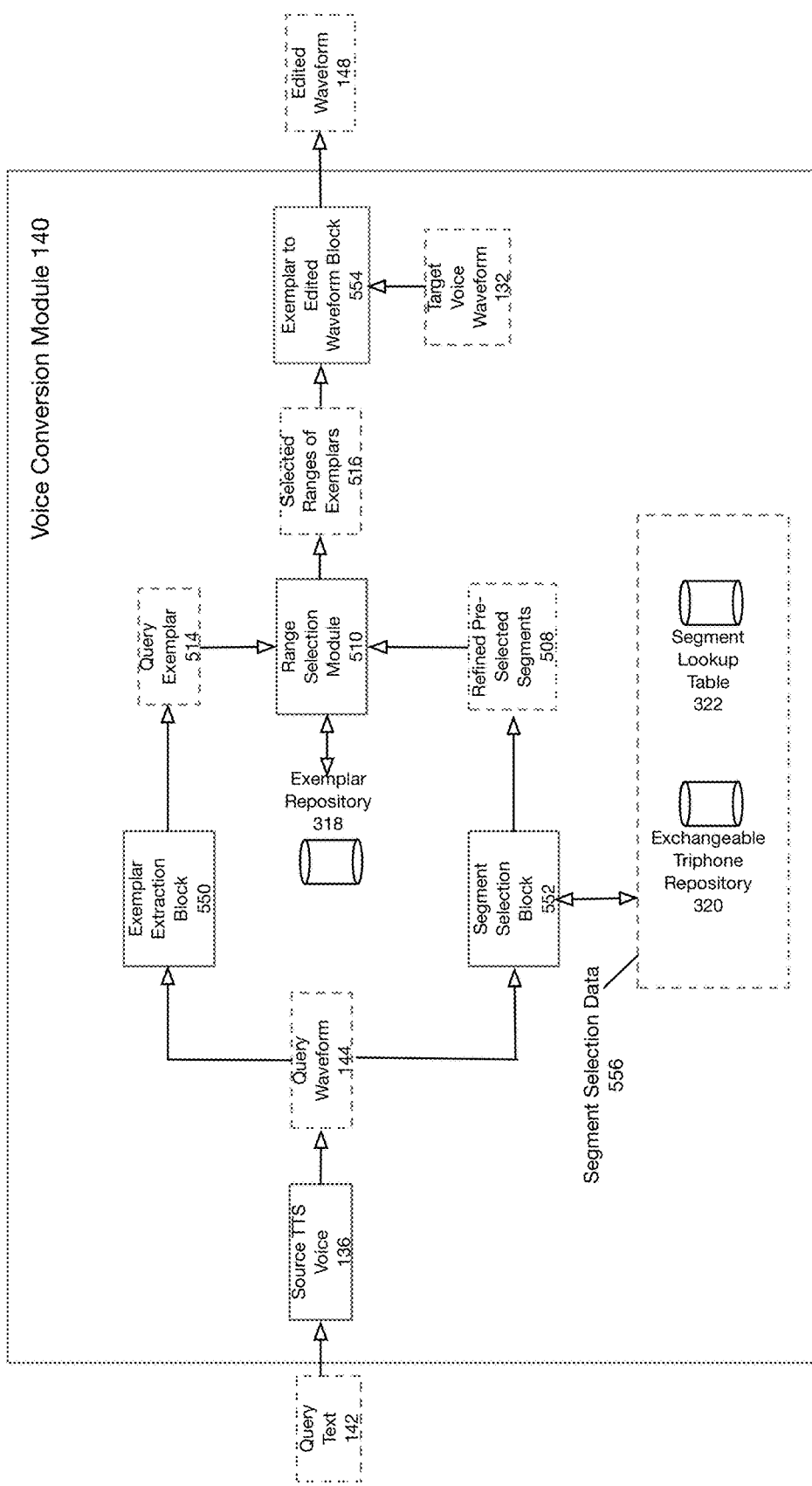
FIG. 5a is a high-level block diagram of a voice conversion module according to one embodiment of the present disclosure.

FIG. 5a is a high-level block diagram of a voice conversion module according to one embodiment of the present disclosure. Voice conversion module 140 may be generated by voice conversion module generator 210 in corpus processing engine 202 and is utilized by interactive voice editing module 204 to perform voice conversion.

As shown in FIG. 5a, query text 142 is received by voice conversion module 140 and processed by source TTS voice 136 to generate query waveform 144. Query waveform 144 is then processed separately both by exemplar extraction block 550 and segment selection block 552, which respectively generate query exemplar 514 and refined pre-selected segments 508. Refined pre-selected segments 508 may comprise segments associated with target voice waveform 132 that have been pre-selected based upon the structure of query waveform. In particular, as will be described below, refined pre-selected segments 508 may represent a filtering or pre-selection of segments in segment lookup table 322 that have been selected based upon a triphone pre-selection process and a dynamic triphone pre-selection process (both described below). The detailed structure of exemplar extraction block 550 and segment selection block 552 will also be discussed below with respect to FIG. 5b.

Query exemplar 514 may be generated by extracting features associated with query waveform 144, which may then be concatenated in some fashion. Note, in contrast with exemplar extraction module 308 shown in FIG. 3a, which utilized both source feature data 310 and target feature data 312, exemplar extraction block 550 utilizes only a single waveform, (i.e., query waveform 144) to generate query exemplar 514.

Segment selection block 552 may utilize information from segment selection data 556, further comprising segment lookup table 322 and exchangeable triphone repository 320 to generate refined pre-selected segments 508. The manner in which segment selection block 552 may utilize these data sources (320 and 322) is described below. For purposes of the current discussion it is sufficient to recognize that segment selection block 552 generates as output refined pre-selected segments utilizing segment selection data 556 based upon query waveform 144.

Query exemplar 514 and refined pre-selected segments 508 are then both received by range selection module 510. Range selection module 510 may perform a range selection process (described below) using query exemplar 514, refined pre-selected segments 508 and data stored in exemplar repository 318 to generate selected ranges of exemplars 516. As will be described in detail below, selected ranges of exemplars 516 may be contiguous portions of exemplars. Selected ranges of exemplars 516 are then provided to exemplar-to-edited-waveform block 554. Exemplar-to-edited-waveform block 554 may then process selected ranges of exemplars 516 to generate edited waveform 148. According to one embodiment of the present disclosure, exemplar-to-edited-waveform block 554 may generate a time domain audio waveform based upon selected ranges of exemplars 516 by converting from exemplars 324 to audio frames.

Figure 5B:
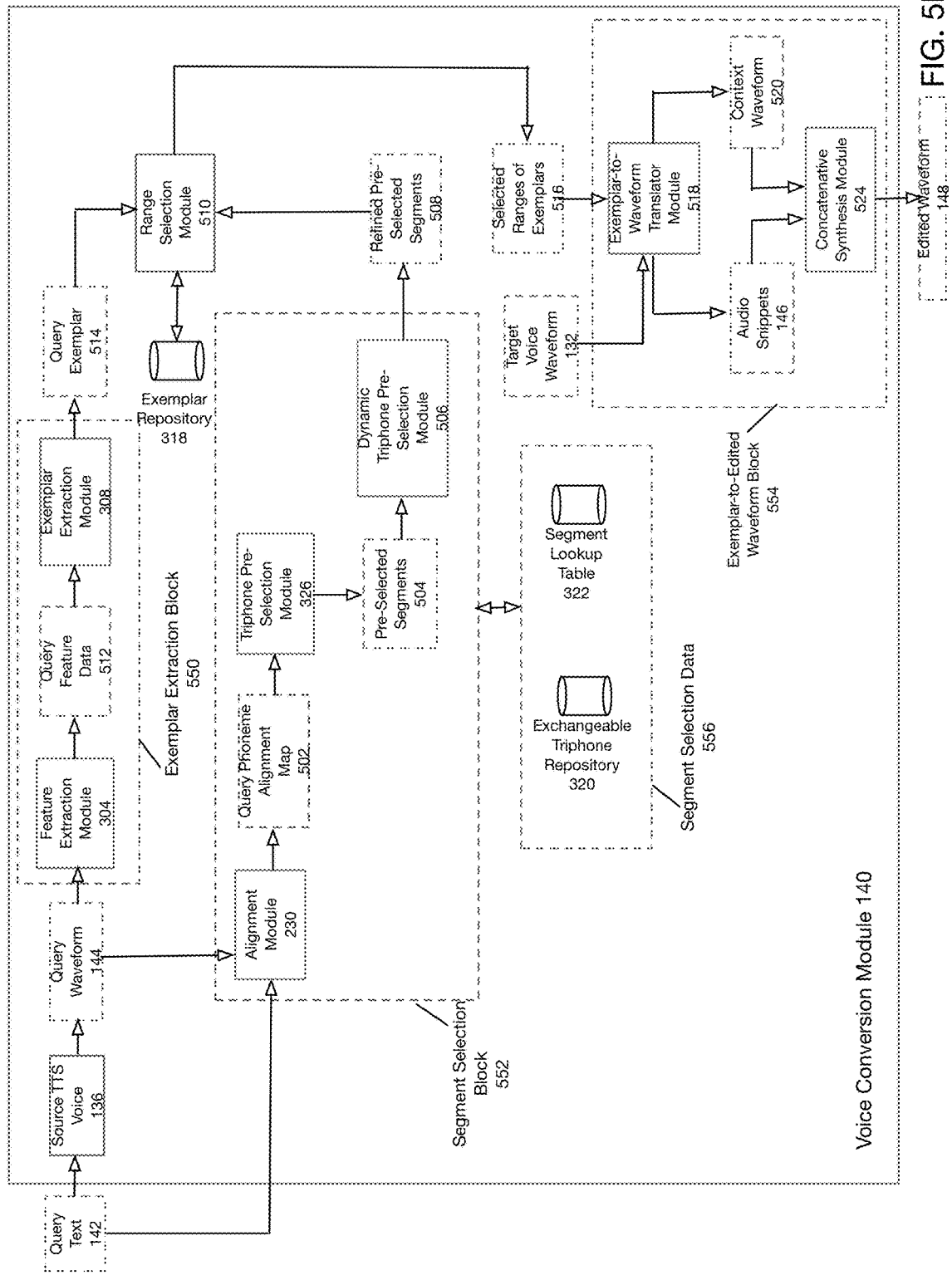
FIG. 5b is a detailed block diagram of a voice conversion module according to one embodiment of the present disclosure.

FIG. 5b is a detailed block diagram of a voice conversion module according to one embodiment of the present disclosure. As shown in FIG. 5b, voice conversion module 140 receives query text 142, which is provided to source TTS voice 136 to generate query waveform 144. Source TTS voice 136 may generate query waveform 144 simply by "speaking" query text 142.

Query waveform 144 may be provided both to segment selection block 552 and exemplar extraction block 550. In particular, with respect to segment selection block 552, query waveform 144 may be provided to alignment module 230 along with query text 142 to generate query phoneme alignment map 502. According to one embodiment, query phoneme alignment map 502 maps each frame in query waveform 144 to a phoneme label.

Query phoneme alignment map 502 may then be provided to triphone pre-selection module 326. Triphone pre-selection module 326 may utilize exchangeable triphone repository 320 and segment lookup table 322 to generate pre-selected segments 504. As previously described, segment lookup table 322 may map each triphone 150 to a segment 164 in target voice waveform 132 corresponding to the middle phoneme 152 in the triphone 150. Thus, triphone pre-selection module 326 may utilize data from phoneme alignment map 502 (i.e., phonemes 152 and phoneme labels) to determine all segments 164 corresponding to the middle phoneme 152 of a triphone 150 in phoneme alignment map. These segments 164 may then be analyzed by triphone pre-selection module 326 in conjunction with data from exchangeable triphone repository 320 and segment lookup table 322 to output pre-selected segments 504.

Dynamic triphone pre-selection module 506 may then operate on pre-selected segments 504 to generate refined pre-selected segments 508, which are provided to range selection module 510. The operation of dynamic triphone pre-selection module 506 will be described below.

Query waveform 144 may also be provided to feature extraction module 304 in exemplar extraction block 550, which generates query feature data 512. Query feature data 512 is provided to exemplar extraction module 308, which generates query exemplar 514, which is also provided to range selection module 510.

Range selection module 510 operates on query exemplar 514, refined pre-selected segments 508 and utilizes exemplar repository 318 to generate selected ranges of exemplars 516. According to one embodiment of the present disclosure, selected ranges of exemplars 516 may be a collection or set of ranges (i.e., a set of tuples indicating starting and ending frames of audio). The operation of range selection module 510 will be described in detail below as well as the nature of selected ranges of exemplars 516.

Selected ranges of exemplars 516 may be provided to an exemplar-to-waveform translator module 518 in exemplar-to-edited waveform block 554, which also receives target voice waveform 132 to generate audio snippets 146 and context waveform 520. As described below, audio snippets 146 may be contiguous portions of an audio waveform (i.e., a sequence of frames). Audio snippets 146 and context waveform 520 are provided to concatenative synthesis module 524, which generates edited waveform 148. According to one embodiment of the present disclosure, a snippet is the corresponding audio frames 162 for an exemplar 324 or set of exemplars 324 in the temporal domain. According to one embodiment of the present disclosure, context waveform 520 may comprise surrounding audio corresponding to the query waveform 144 to be inserted or replaced. Concatenative synthesis module 524 may perform digital signal processing or other processing to appropriately combine or stitch together audio snippets 146.

Figure 5C:
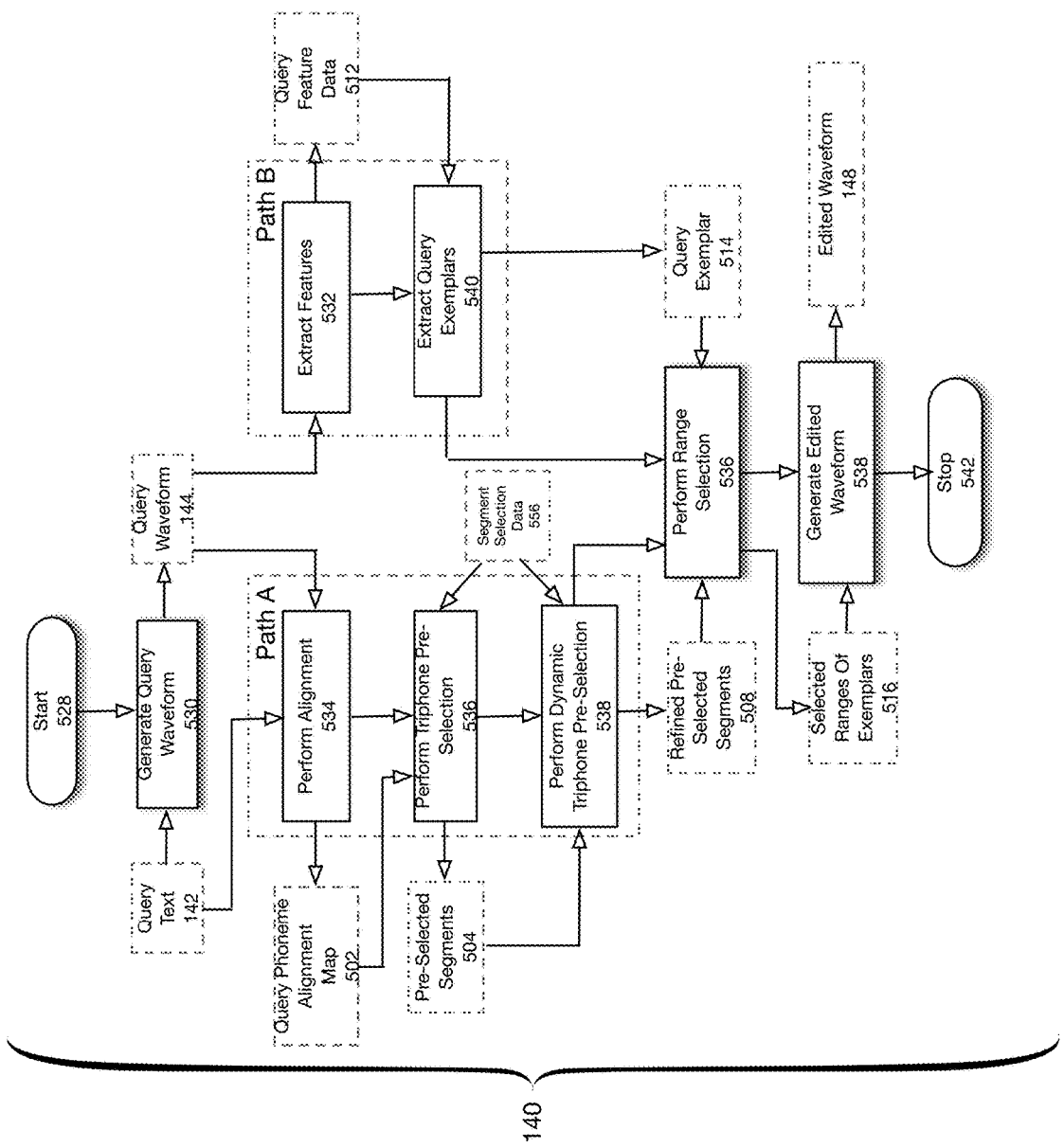
FIG. 5c is a flowchart depicting an operation of a voice conversion module according to one embodiment of the present disclosure.

FIG. 5c is a flowchart depicting an operation of a voice conversion module according to one embodiment of the present disclosure. The process shown in FIG. 5c may be performed by voice conversion module 140. The process is initiated in 528. In 530, query waveform 144 is generated from query text 142 using source TTS voice 136. As previously discussed, query waveform 144 may be generated by having source TTS voice 136 "speak" query text 142.

Query waveform 144 is then processed independently in path A and path B as shown in FIG. 5c. In particular, in path A, query waveform 144 is processed to generate pre-selected segments 504 as follows. In 534, an alignment process is performed using query text 142 and query waveform 144 to generate query phoneme alignment map 502. As previously described, query phoneme alignment map 502 may map particular phonemes 152 in query text 142 to temporal regions of query waveform 144.

Triphone Preselection

In 536, triphone pre-selection is performed using query alignment map 502 to generate pre-selected segments 504. A triphone preselection process will now be described. According to one embodiment of the present disclosure, frames that are unlikely to be selected during matching may be removed by operating on the level of triphones 150 rather than phones or diphones. Triphone pre-selection may be performed by triphone pre-selection module 326 shown in FIG. 3a. As previously described, a segment 164 comprises a portion of an audio waveform spanning a phoneme 152. A triphone 150 comprises a phoneme 152 and its two neighbors. For example, for the word "user" (phonemes: Y UW1 Z ER0), the triphones 150 are:

(st)_Y_UW1, Y_UW1_Z, UW1_Z_ER0, Z_ER)_(ed)

where (st) and (ed) label the beginning and end of a sentence. According to one embodiment, based upon query phoneme alignment map 502 in which each audio frame 162 is mapped to a phoneme label, these phoneme labels are converted to triphone labels using the phoneme label of the middle phoneme 152 of the triphone 150. Using this labeling based upon triphones 150, for each query frame in query waveform 144, only frames of the target voice that share the same triphone label will be selected as candidate matches. This may be accomplished using segment lookup table 322 in segment selection data 556, which maps each triphone 150 to all segments 164 in the target voice waveform 132 corresponding to the middle phoneme 152 in the triphone 150.

In 538, dynamic triphone pre-selection is performed on pre-selected segments 504 to generate refined pre-selected segments 508. A process for performing dynamic triphone pre-selection is described below. For purposes of the present discussion, it is sufficient to recognize that the process performed by dynamic triphone pre-selection in 536 further refines the candidate set of segments from pre-selected segments 504 to refined pre-selected segments 508.

As shown in FIG. 5c, query waveform 144 is also processed in 532 to extract features, for example MFCCs and F0s to generate query feature data 512. In 540, query exemplar 514 is generated from query feature data 512. As previously described, query exemplar 514 may be generated by concatenating query features in query feature data 512.

In 536, refined pre-selected segments 508 and query exemplar 514 are processed using a range selection process to generate selected ranges of exemplars 516. A process for performing range selection is described in detail below. In 538, selected ranges of exemplars 516 are processed to generate edited waveform 148, which represents the final waveform in which query text 142 has either been utilized as insertion material or replacement material in target voice waveform 132.

Dynamic Triphone Preselection

According to one embodiment a DTP process may select a small set of segments 164 per query triphone 150 such that the sequences of frames have the minimal number of breaks. Similar to the triphone preselection step 536, when exact matches are unavailable, diphones and monophones may be used instead. Because non-consecutive phoneme segments 164 will introduce a break in the matching step (i.e., range selection described below) they may be minimized with priority. In addition, according to one embodiment of the present disclosure, the number of neighboring triphone segments 164 that do not match, e.g. sp_S_I and P_I_G, are also minimized because they are likely to cause audible distortion when they are stitched together. Finally, the number of diphones and interchangeable triphones are also minimized because they are an approximation to the desired triphone 150 in the query. In light of all of these criteria, the problem is to minimize an energy function of matching cost (similarity between query triphone 150 and a candidate triphone segment 164) and concatenation cost (whether there is a break and whether a segment 164 matches its previous segment's triphone 150).

Figure 6A:
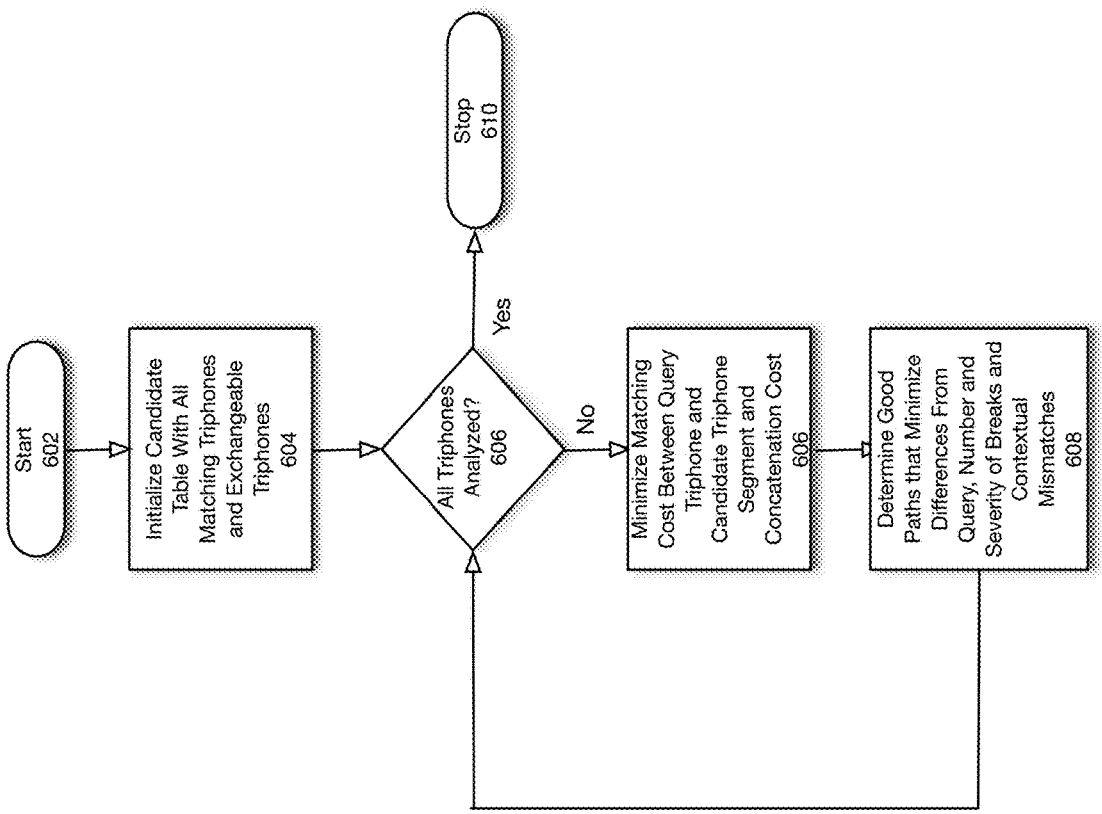
FIG. 6a is a flowchart of a DTP process according to one embodiment of the present disclosure.

FIG. 6a is a flowchart of a DTP process according to one embodiment of the present disclosure. The process is initiated in 602. In 604, for each query triphone 150 $q$, its candidate table is initialized with all matching triphones, with exchangeable triphones also included. In 606, it is determined whether all triphones 150 have been analyzed. If so ('yes' branch of 606), the process ends in 610. If not ('no' branch of 606), in 606 a matching cost is minimized between the current triphone 150 and candidate triphone segment 164 as well as concatenation cost. In 608, good paths are determined that minimize difference between the query, number and severity of breaks and contextual mismatches. Flow then continues with 606.

Figure 6B:
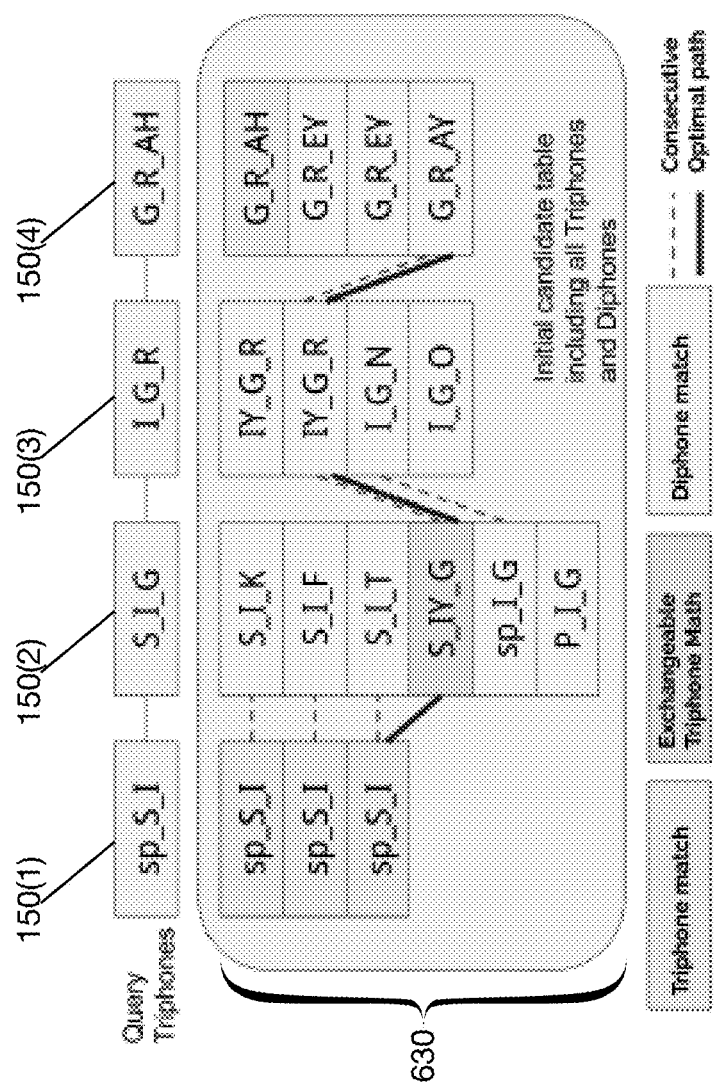
FIG. 6b illustrates an example of dynamic triphone preselection according to one embodiment of the present disclosure.

FIG. 6b illustrates an example of dynamic triphone pre-selection according to one embodiment of the present disclosure. For each query triphone 150 a candidate set of good potential matches is determined (columns below). Between neighboring phonemes 152, some segments 164 are consecutive (dotted links) in target voice waveform 132 and some are not. Good paths through this set minimize differences from the query, number and severity of breaks, and contextual mismatches between neighboring triphones 150.

Range Selection

According to one embodiment of the present disclosure, rather than employ unit selection during the matching process, a range selection process may be utilized. Thus, instead of selecting individual frames and indirectly encouraging continuity using a high concatenation cost, a range selection process may select ranges of consecutive frames directly by choosing their starting and ending boundaries so that the sequences sound similar to the query in terms of phonemes 152 and pace and are characterized by low distortion at the stitching points.

Selecting a range of frames instead of individual ones offers several advantages: (1) it allows the definition of similarity at the sequence level rather than the frame level and thus more sophisticated similarity measures such as Mel-Cepstral Distortion ("MCD") can be used; (2) it is an order of magnitude faster than frame level unit selection—by a factor of average number of audio frames 162 per phoneme 152; and (3) it includes duration of phonemes 152 as part of the cost function, offering explicit controls on the pace of the resulting synthesis—it is superior to the skip and repeat costs in unit selection, which do not have a direct influence on the duration of the synthesized signal.

According to one embodiment, based on pre-selected phoneme segments 164, a range selection process finds a small set of subsequences from those segments 164 or "range", expressed by its starting and ending audio frame 162 numbers. For purposes of this discussion ⟨s,t⟩ will represent a range from audio frame s 162 to audio frame t 162.

Figure 7A:
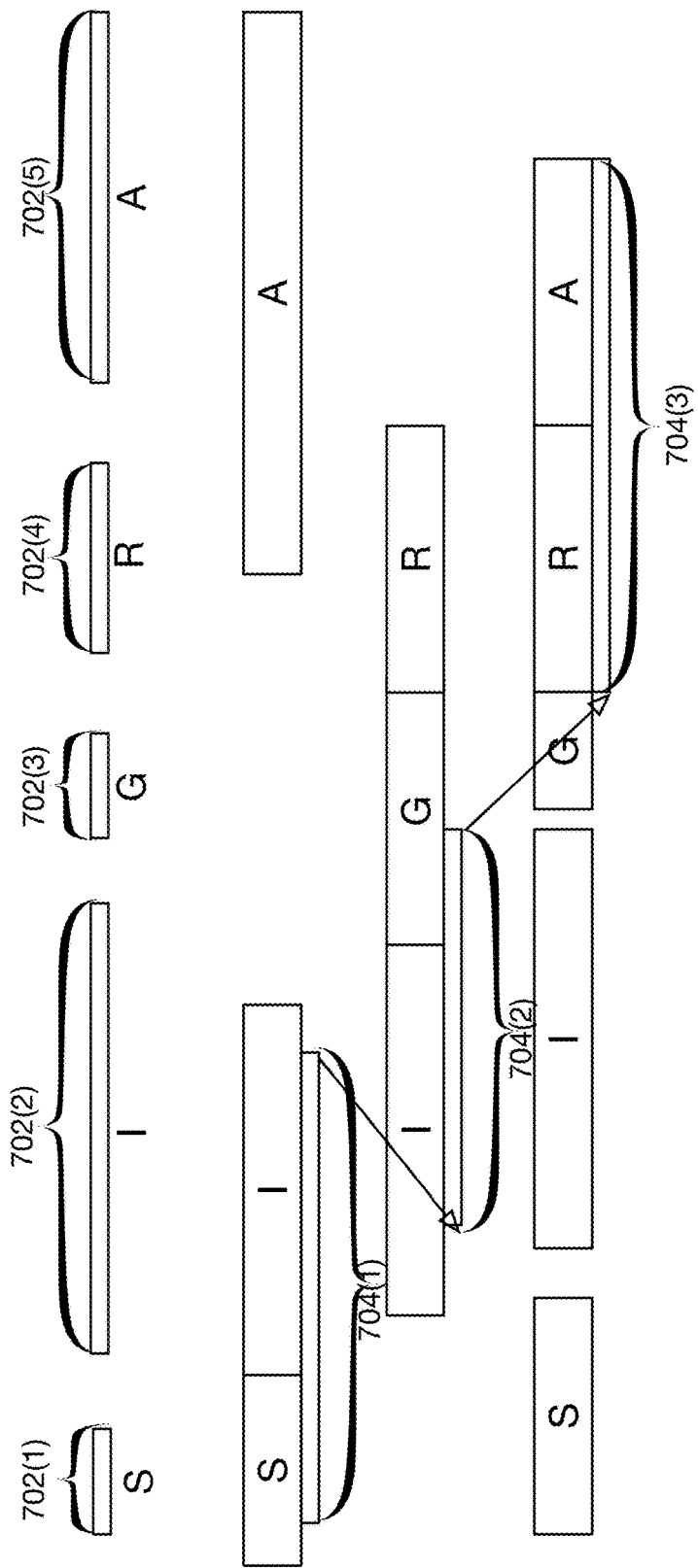
FIG. 7a depicts a range selection objective according to one embodiment of the present disclosure.

FIG. 7a depicts a range selection objective according to one embodiment of the present disclosure. The 702(1)-702(5) represent the query phonemes 152 with length proportional to their duration. The wider bars are candidate phoneme segments 164 as selected, for example, by a DTP process; consecutive segments 164 are visually next to each other. The 704(1)-704(3) depicts one possible selection of the candidates while the arrows show where stitching occurs between the selected range of segments.

According to one embodiment of the present disclosure that also utilizes DTP (discussed above), because DTP ensures that breaks will only occur once per phoneme 152, the number of ranges selected per phoneme 152 can correspondingly be limited to be at most two (e.g. phoneme 152 "I" in FIG. 7a). This means that for each query phoneme 152, at most two candidate segments 164 are considered, and the ranges selected are determined from the subsequences associated with query phoneme 152.

Since only one break is allowed per phoneme 152, the break will occur in one of the two locations: (case 1) inside a phoneme 152, e.g., the break inside phoneme 152 "I" in FIG. 7a; and (case 2) between two phonemes, e.g., the break between phoneme 152 "G" and "R" in FIG. 7a. In case 1, the range selected must cover the beginning of phoneme 152 (first candidate of phoneme 152 "I") because otherwise it will introduce one more break, violating the rule. Then it will transition to either another candidate in the same phoneme 152 (second candidate of phoneme 152 "I") or to the next phoneme 152 (phoneme "G" transitioning to "R"). Note that transitioning to another candidate of the same phoneme 152 means a second range is selected and the second range must extend to the end of the phoneme 152 (second candidate of phoneme 152 "I"); otherwise an extra break will occur. In case 2, there should only be one range selected inside the phoneme 152 because if there are two, one more break is introduced.

Figure 7B:
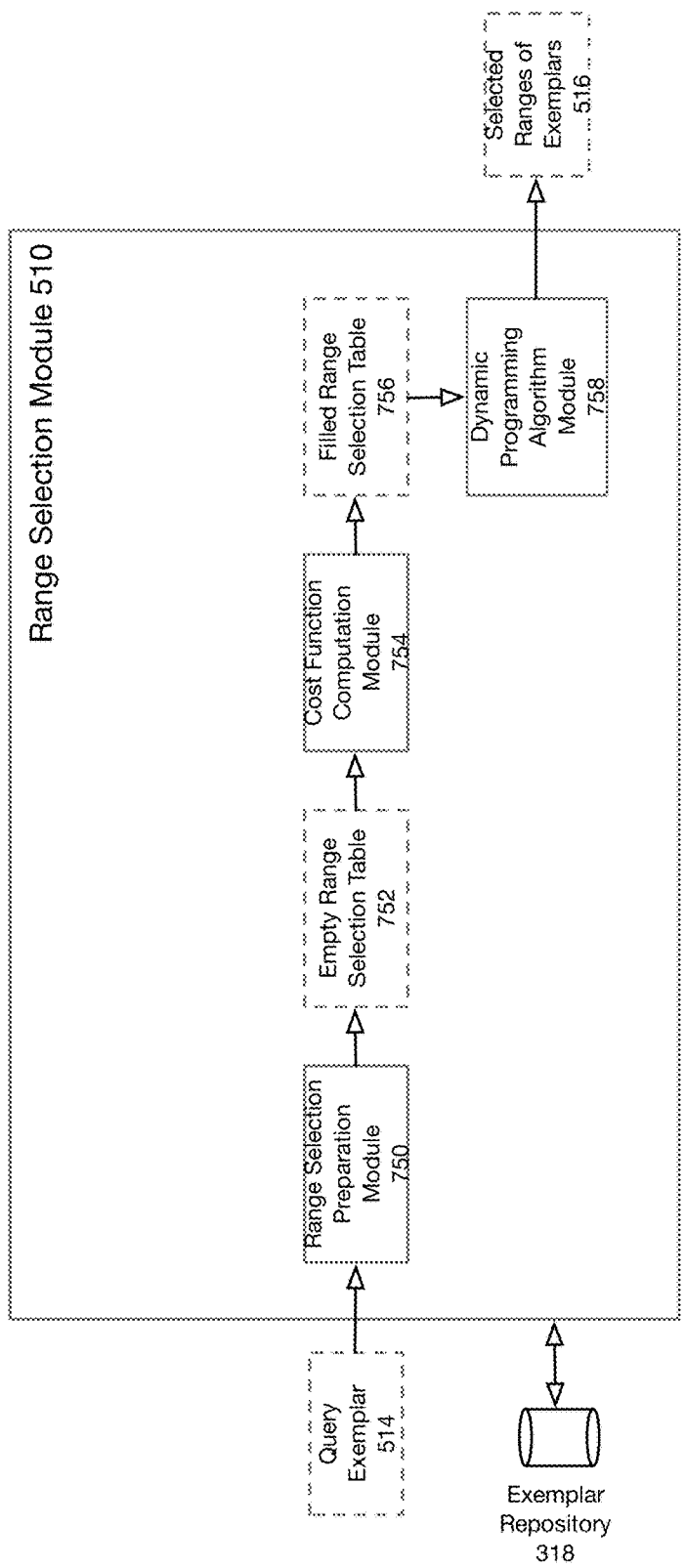
FIG. 7b is a block diagram of a range selection module according to one embodiment of the present disclosure.

FIG. 7b is a block diagram of a range selection module according to one embodiment of the present disclosure. As shown in FIG. 7b, range selection module 510 may comprise range selection preparation module 750, cost function computation module 754 and dynamic programming algorithm module 758. Range selection may receive query exemplar 514 and utilize data from exemplar repository 318 as input. Range selection module 510 may generate selected ranges of exemplars 516 as output.

As shown in FIG. 7b, query exemplar 514 may be processed by range selection preparation module 750 to generate empty range selection table 752. Empty range selection table 752 may be processed by cost function computation module 754 to generate filled range selection table 756. Filled range selection table 756 may be processed by dynamic programming algorithm module 758 to generate selected ranges of exemplars 516.

Figure 7C:
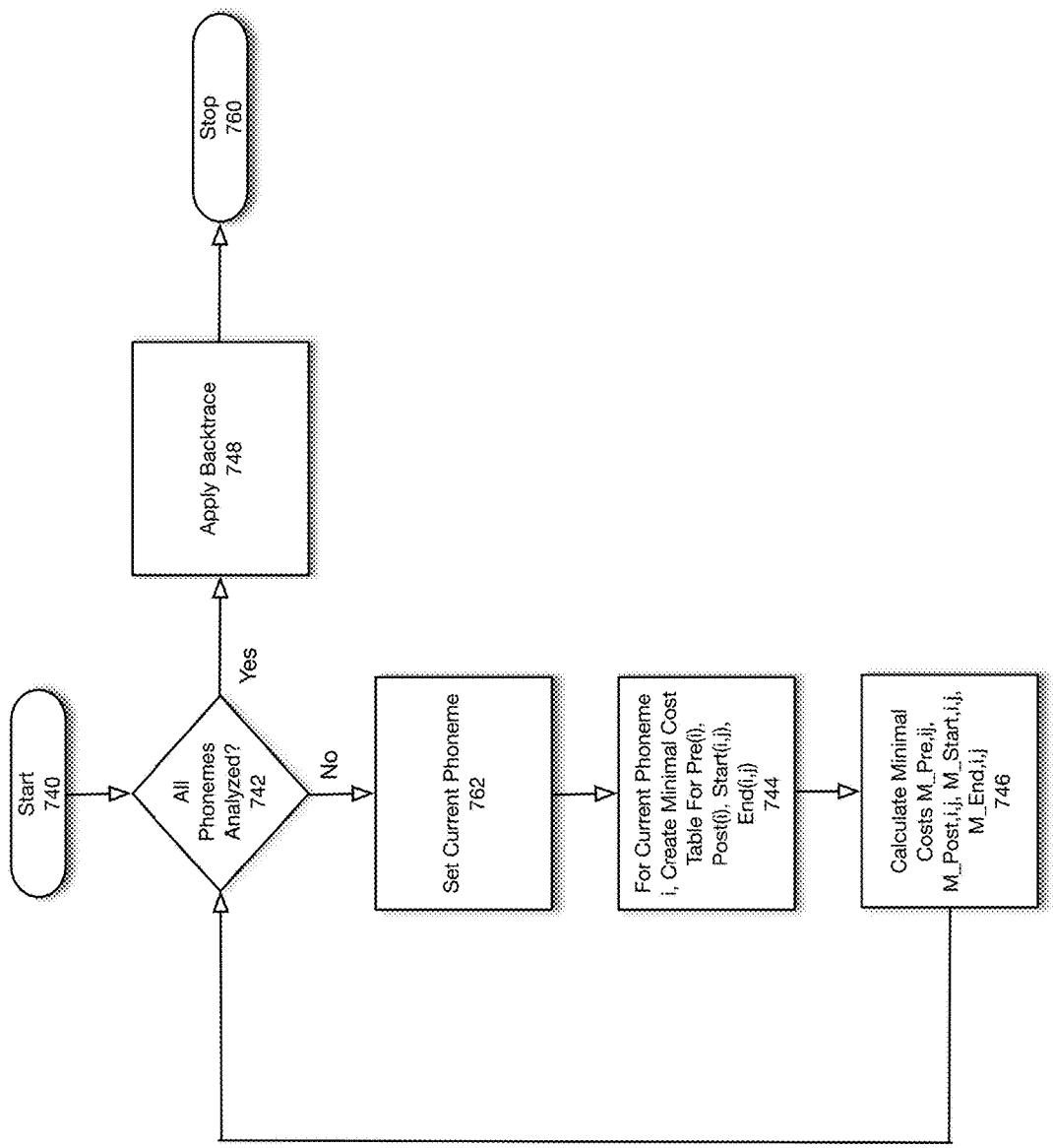
FIG. 7c is a flowchart of a range selection process according to one embodiment of the present disclosure.

FIG. 7c is a flowchart of a range selection process according to one embodiment of the present disclosure. The process is initiated in 740. In 742, it is determined whether all phonemes 152 have been analyzed. If not ('No' branch of 742), in 762 the current phoneme 152 is set. In 744, a minimal cost table is created for the current phoneme 152 (see discussion of Pre, Post, Start and End equations below). In 746, minimal costs $M_{Pre,i,j}$, $M_{Post,i,j}$, $M_{Start,i,j}$ and $M_{End,i,j}$ (see discussion below) are computed. Flow then continues with 742 where it is determined whether all phonemes 152 have been analyzed. If all phonemes 152 are analyzed ('Yes' branch of 742), flow continues with 748 and a backtrace process is applied. The process ends in 760.

A more detailed analysis of a range selection process will now be described. To optimize for similarity, smooth transition and pace, an objective function may be defined as follows. Let $\mathcal{R}_{ij}$ be the j-th candidate segment 164 for phoneme 152 $i$ chosen by DTP. Each segment 164 can be represented with two numbers, the beginning and ending frame indices, $\mathcal{R}_{ij} = \langle b_{ij}, e_{ij} \rangle = \{b_{ij}, b_{ij}+1, e_{ij}\}$. Let $\mathcal{R}_{ik}$ be the k-th selected range for phoneme 152 $i$, where $\mathcal{R}_{ik} = \langle s_{ik}, t_{ik} \rangle$. Define the set of ranges selected for phoneme i as $\mathcal{R}_i = \{\mathcal{R}_{ik} | k \in (1, K_i)\}$ where $K_i \in 1,2$ is the number of ranges selected for phoneme 152 $i$. According to one embodiment of the present disclosure, a range selection process may minimize the following function:

$$O_{rs} = \sum_{i=1}^{n}(\alpha S(q_i, \mathcal{R}_i) + \beta L(q_i, \mathcal{R}_i)) + \sum_{i=1}^{n} \mathcal{C}_i + \sum_{i=2}^{n} \mathcal{D}_i$$

where $q_i$ is the i-th query phoneme 152. Functions S and L measure similarity cost and duration cost respectively between the query phoneme 152 and the selected ranges $\mathcal{R}_i$. The weights of functions S and L may be controlled by parameters $\alpha$ and $\beta$. Functions $\mathcal{C}_i$ and $\mathcal{D}_i$ are two types of concatenation costs that penalize concatenating ranges that are dissimilar at the boundaries. In particular, according to one embodiment of the present disclosure, $\mathcal{C}_i$ may be utilized for a concatenation point in the middle of a segment 164 (case 1) and $\mathcal{D}_i$ may be utilized for a concatenation point at the beginning of a segment 164 (case 2). According to one embodiment of the present disclosure, balancing between concatenation, similarity and duration cost ($\alpha=1$, $\beta=6$) is utilized.

According to one embodiment of the present disclosure, the optimization of $O_{rs}$ may be solved utilizing a dynamic programming process, which is not described. According to one embodiment of the present disclosure, the concatenation costs $\mathcal{C}_i$ and $D_i$ may be defined as follows:

$$\mathcal{C}_i = \begin{cases} 0 & \text{if } K_i = 1 \\ C(t_{i1}, s_{i1}) & \text{if } K_i = 2 \end{cases}$$

$$\mathcal{D}_i = C(t_{i-1,K_{i-1}}, s_{i1})$$

The function C(t,s) represents the distortion transitioning from frame t to frame s. According to one embodiment of the present disclosure, C(t,s) may be the Euclidean distance between an exemplar feature of frame t to a corresponding feature of frame s. According to one embodiment of the present disclosure, the similarity cost S may comprise the Mel-Cepstral Distortion ("MCD"). Further, according to one embodiment, the duration cost $$L(r_1, r_2) = \log\frac{r_1}{r_2}$$

where $r_1$ and $r_2$ are lengths.

According to one embodiment of the present disclosure, the number of ranges per phoneme 152 may be limited to at most two and thus in this case, there are two possible possibilities of the range for each phoneme 152. A first possibility is to choose two ranges, one that starts from phoneme boundary (herein referred to as "Pre") and the other ends at a phoneme boundary (herein referred to as "Post"). A second possibility is to choose only 1 range, starting and ending in the same phoneme segment 164; herein, its starting point is referred to as "Start" and ending point "End".

Dynamic programming can be used to solve for the optimization of $O_{rs}$ efficiently. In particular, let $n_i$ be the number of candidates for phoneme 152 $i$. For a segment 164 $\langle b_{ij}, e_{ij} \rangle_{j=1 \ldots n_i}$, the only valid ranges set for each query phoneme 152 $i$ should belong to one of the following two sets:

$$\text{Pre}(i) \times \text{Post}(i) \equiv \{\langle r_{pre}, r_{post}\rangle | r_{pre} \in \text{Pre}(i), r_{post} \in \text{Post}(i)\}$$

$$\text{Start}(i) \otimes \text{End}(i) \equiv \{\langle b, e\rangle | j \in [n_i], b \in \text{Start}(i, j),$$

$$e \in \text{End}(i, j), b < e\}$$

-continued where $$\text{Pre}(i) = \{\langle b_{ij}, b_{ij} + k\rangle \mid j \in [n_i], k \in \text{Start}(i, j), k \in [e_{ij} - b_{ij}]\}$$

$$\text{Post}(i) = \{\langle b_{ij} + k, e_{ij}\rangle \mid j \in [n_i], k \in \text{Start}(i, j), k \in [e_{ij} - b_{ij}]\}$$

$$\text{Start}(i, j) = \{b_{ij}, b_{ij} + 1, \ldots, e_{ij} - 1\}$$

$$\text{End}(i, j) = \{b_{ij} + 1, b_{ij} + 2, \ldots, e_{ij}\}$$

$$\text{Start}(i) = \bigcup_{j=1}^{n_i} \text{Start}(i, j)$$

$$\text{End}(i) = \bigcup_{j=1}^{n_i} \text{End}(i, j)$$

For example, if a segment 164 contains frame 1 through frame 3, then the above four sets are:
Pre=$\{\langle 1,2\rangle, \langle 1,3\rangle\}$
Post=$\{\langle 1,3\rangle, \langle 2,3\rangle\}$
Start=$\{1,2\}$
End=$\{2,3\}$
And, the valid ranges are:

$$\text{Pre} \times \text{Post} = \{\{\langle 1,2\rangle, \langle 1,3\rangle\}, \{\langle 1,2\rangle, \langle 2,3\rangle\}, \{\langle 1,3\rangle, \langle 1,3\rangle\}, \{\langle 1,3\rangle, \langle 2,3\rangle\}\}$$

and, $$\text{Start} \otimes \text{End} = \{\{\langle 1,2\rangle\}, \{\langle 1,3\rangle\}, \{\langle 2,3\rangle\}\}$$

Because only one phoneme 152 is under consideration (i=1), 'i' may be omitted from the equation. Next, a set of valid ranges may be selected to minimize an objective function. First, a minimal cost table is prepared by for each phoneme i, preparing a note for each of the elements in the sets Pre(i), Post(i), $\{\text{Start}(i,j)\}_j$ and $\{\text{End}(i,j)\}_j$. Let F(Pre,i,j) be the corresponding frames of the j-th element in set Pre(i) and $M_{Pre,i,j}$ be its minimal cost. The same may be applied to Post, Start and End to generate $M_{Post,i,j}$, $M_{Start,i,j}$ and $M_{End,i,j}$.

With these constructs, a dynamic programming algorithm may be applied that selects a transition path through the table and combines ranges to obtain minimal cost M. In particular, for Start and Pre, their preceding ranges are always from the previous phoneme 152. Therefore, the minimal cost M is defined to be the smallest of all their preceding ranges' minimal costs M plus concatenation cost C. If the ranges are consecutive, the concatenation cost is 0.

A complete mathematical definition is as follows:

$$\mathcal{M}_{Pre,i,j} = \min\left(\min_t \{\mathcal{M}_{Post,i-1,t} + \mathcal{C}(\mathcal{F}_{Post,i-1,t}, \mathcal{F}_{Pre,i,j})\},\right.$$
$$\left.\min_t \{\mathcal{M}_{End,i-1,t} + \mathcal{C}(\mathcal{F}_{End,i-1,t}, \mathcal{F}_{Pre,i,j})\}\right)$$

$$\mathcal{M}_{Start,i,j} = \min\left(\min_t \{\mathcal{M}_{Post,i-1,t} + \mathcal{C}(\mathcal{F}_{Post,i-1,t}, \mathcal{F}_{Start,i,j})\},\right.$$
$$\left.\min_t \{\mathcal{M}_{End,i-1,t} + \mathcal{C}(\mathcal{F}_{Post,i-1,t}, \mathcal{F}_{Start,i,j})\}\right)$$

$$\mathcal{M}_{Post,i,j} = \min_t \{\mathcal{M}_{Pre,i,t} + \alpha \mathcal{S}(q_i, \{\mathcal{F}_{Pre,i,t}, \mathcal{F}_{Post,i,j}\}) +$$
$$\beta \mathcal{L}(q_i, \{\mathcal{F}_{Pre,i,t}, \mathcal{F}_{Post,i,j}\}) + \mathcal{C}(q_i, \{\mathcal{F}_{Pre,i,t}, \mathcal{F}_{Post,i,j}\})\}$$

$$\mathcal{M}_{End,i,j} = \min_t \{\mathcal{M}_{Start,i,t} + \alpha \mathcal{S}(q_i, \{<\mathcal{F}_{Start,i,t}, \mathcal{F}_{End,i,j}>\}) +$$
$$\beta \mathcal{L}(q_i, \{<\mathcal{F}_{Start,i,t}, \mathcal{F}_{End,i,j}>\})\}$$

Figure 7D:
FIG. 7d illustrates an example operation of a range selection process according to one embodiment of the present disclosure.

FIG. 7d illustrates an example operation of a range selection process according to one embodiment of the present disclosure. As shown in FIG. 7d, 730 represents frames selected by DTP, which are numbered by frame indices. Reference numeral 732 shows a dynamic programming table, where each box shows the frame-range it represents; the connections between boxes show dynamic programming dependencies. The bold boxes and connections show an example solution, wherein frame ranges 1-4, 5-6, 10-11 and 12-13 are selected. As shown in 732, the fully connected costs are the $\mathcal{D}$'s and the $\mathcal{C}$'s, L's and S's are embodied in drawn connections.

Main Editing Interface

Figure 8A:
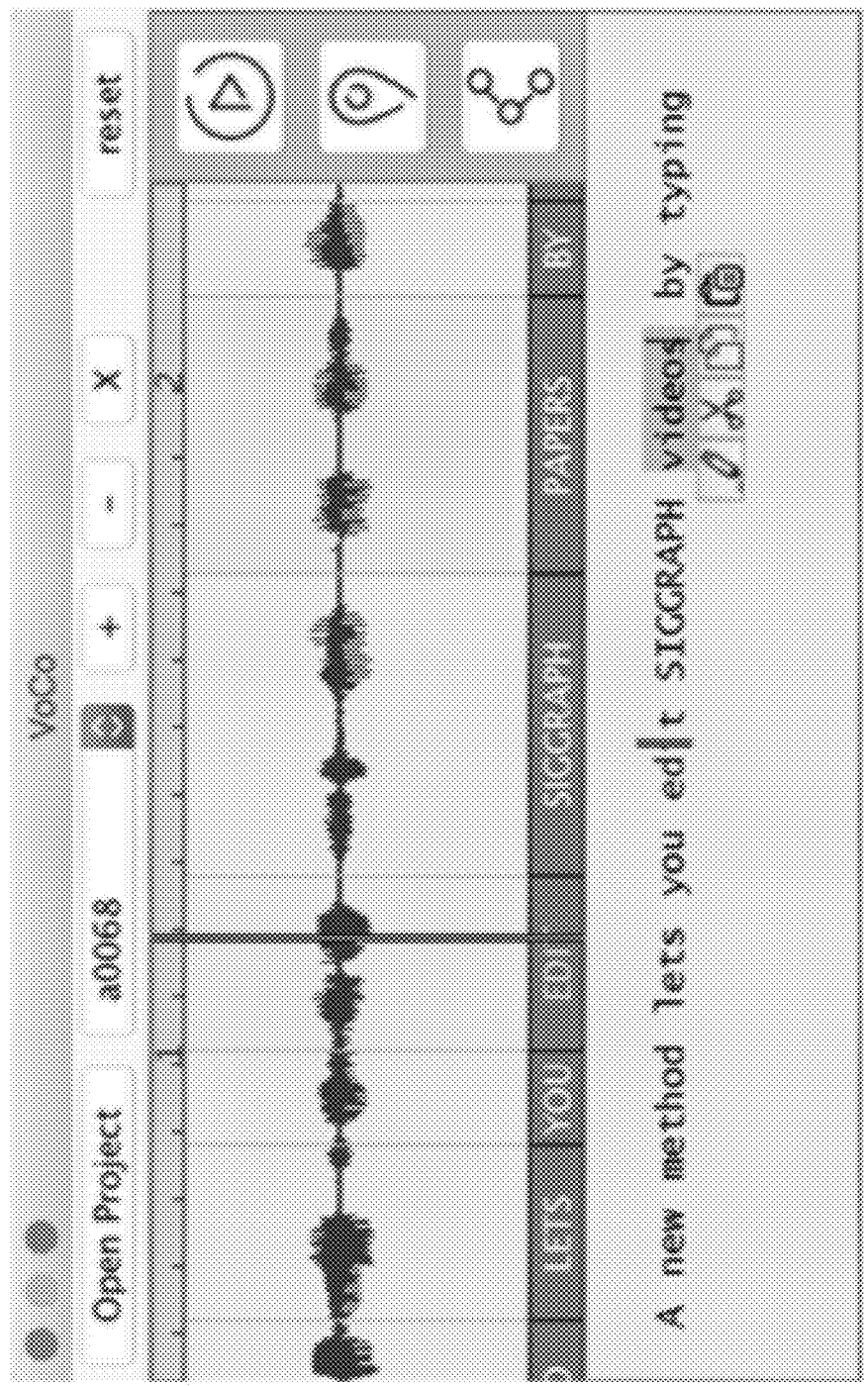
FIG. 8a shows a main editing interface according to one embodiment of the present disclosure.

FIG. 8a shows a main editing interface according to one embodiment of the present disclosure. Using this interface, an editor can cut, copy and paste text in the transcript in order to effect changes in the narration. According to one embodiment of the present disclosure, an editor can also replace existing words or type new words not in the narration (in this case replacing "papers" with "videos") such that interactive voice editing system 200 will synthesize a result that matches the voice of the speaker.

Alternative Synthesis and Alternative Synthesis User Interface

Figure 8B:
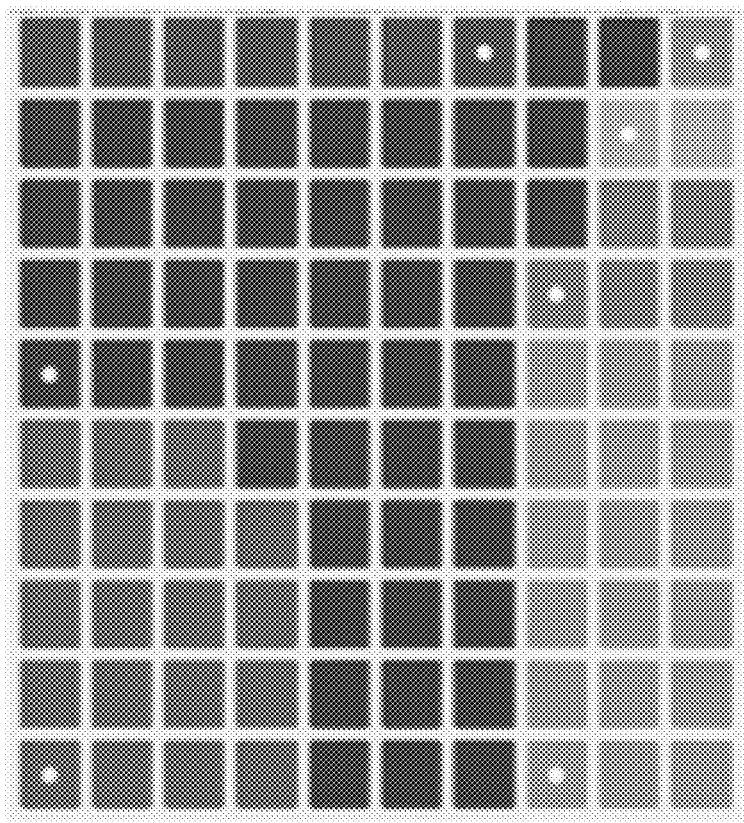
FIG. 8b shows a grid of alternative synthesis results according to one embodiment of the present disclosure.

FIG. 8b shows a grid of alternative synthesis results according to one embodiment of the present disclosure. While the default range selection method uses predefined $\alpha$ and $\beta$ values according to some embodiments, alternative syntheses can be produced by using different combinations of $\alpha$ and $\beta$. Since $\alpha$ is the weight of similarity, the higher the value of $\alpha$, the closer to the query the synthesis sounds will be, in both pitch and timbre. A higher $\alpha$ is more likely to lead to stitching distortion while a lower $\alpha$ is likely to lead to a smoother synthesis result since it is less restricted in terms of pitch and timbre. Similarly, higher $\beta$ makes the duration of the synthesis closer to the query while lower $\beta$ is less restrictive in terms of duration. FIG. 8b shows a grid of results produced by varying values of $\alpha$ and $\beta$ for range selection. Each cell represents one alternative.

Figure 8C:
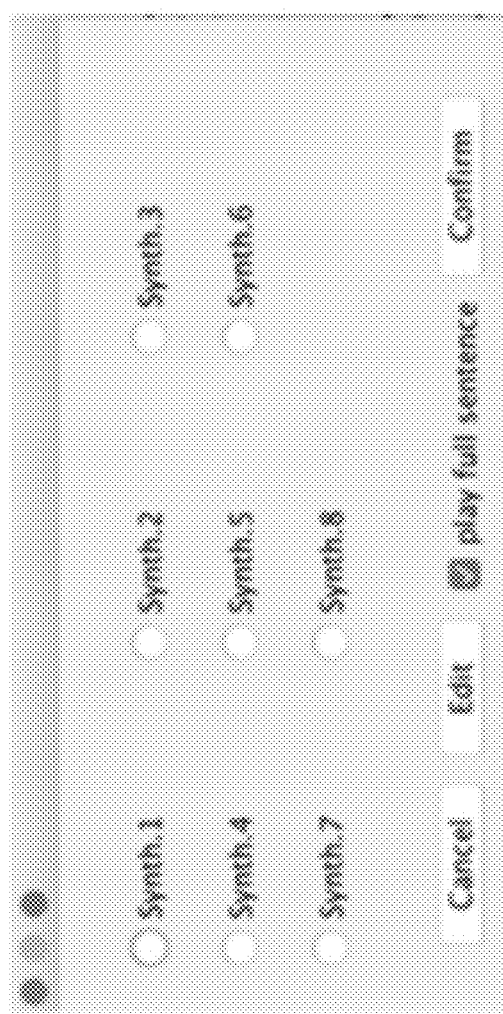
FIG. 8c shows a user interface for presenting alternative voice conversion results according to one embodiment of the present disclosure.

FIG. 8c shows a user interface for presenting alternative voice conversion results according to one embodiment of the present disclosure. As shown in FIG. 8c, alternative results may be organized in a list. Via radio buttons or some other user interface controls, a user can quickly listen to alternatives and then optionally change modes (e.g., via a checkbox) to listen to how each alternative sounds in the context of a full sentence. This allows a user/editor who may not be satisfied with the default synthesis to explore among several alternative pronunciations.

Manual Editing

According to some embodiments, users with audio editing skills may customize the synthesis result using two advanced editing options which can be applied sequentially. As previously described, a synthesized word may be created by stitching together audio snippets 146 of words from the target voice corpus. By clicking on an "Edit" button in an alternative syntheses window, a user may be presented with a new window containing multiple audio tracks that depict these audio snippets 146.

Figure 9A:
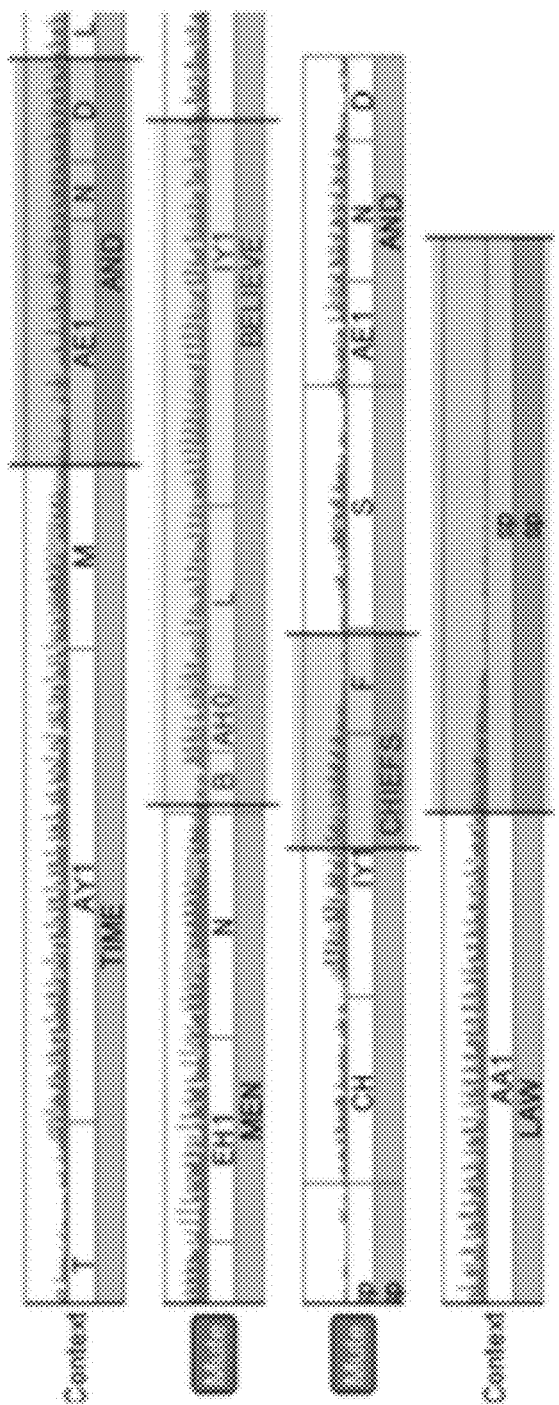
FIG. 9a shows a user interface that provides fine-grain control over the boundaries of audio snippets 146 selected by an interactive voice editing system according to one embodiment of the present disclosure.

FIG. 9a shows a user interface that provides fine-grain control over the boundaries of audio snippets 146 selected by an interactive voice editing system according to one embodiment of the present disclosure. As shown in FIG. 9a, a user/editor may adjust the boundaries of the audio snippets 146, change the lengths and find new stitching points.

Figure 9B:
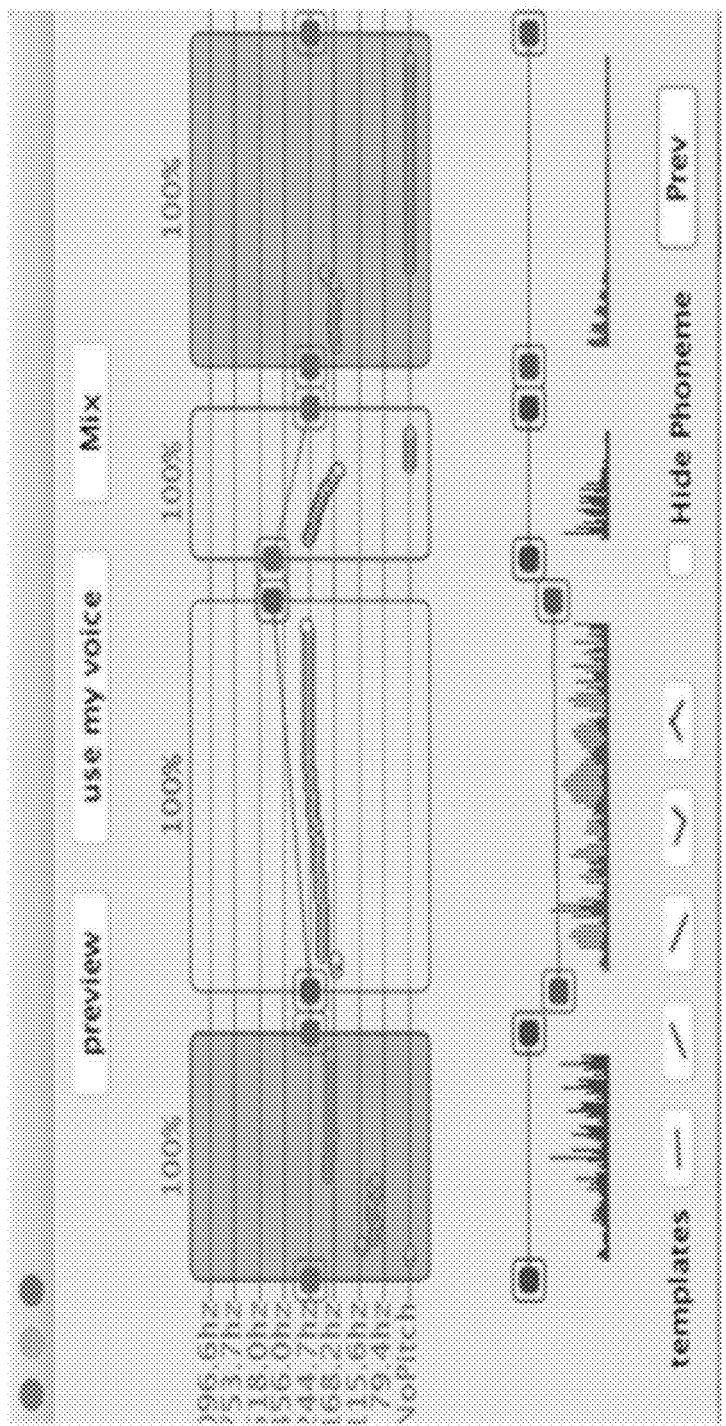
FIG. 9b shows a user interface allowing advanced editing for manual adjustment of pitch profile, amplitude and snippet duration.

FIG. 9b shows a user interface allowing advanced editing for manual adjustment of pitch profile, amplitude and audio snippet duration. According to some embodiments, after previous changes are confirmed, the user interface shown in FIG. 9b may appear that allows a user to adjust the pitch contour of each audio snippet 146 (shown as a graph of dots) either by dragging handles or by choosing one of a pre-selected set of pitch profiles shown at the bottom of the window. This window may also allow the editor to adjust the amplitude and/or duration of each audio snippet 146 by dragging the top or sides of the box that surrounds it.

According to some embodiments as an alternative to manually adjusting the pitch and timing, a user may speak into a microphone to demonstrate how a target word should be spoken. The target word will then be re-synthesized taking into account the users' pitch and timing features. Manual editing can further improve on words selected via alternative syntheses.

Figure 10:
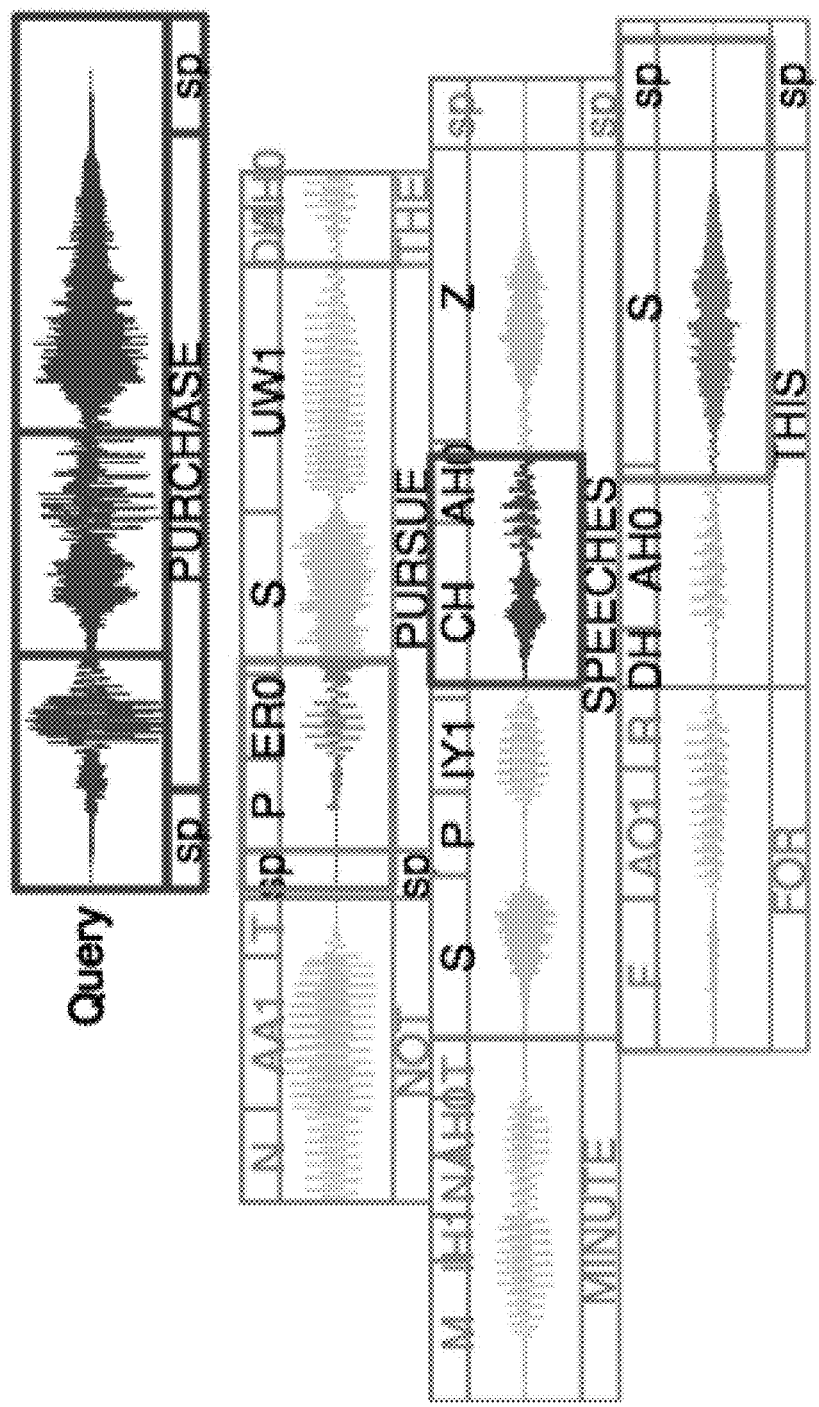
FIG. 10 shows various examples of a synthesis results according to one embodiment of the present disclosure.

FIG. 10 shows various examples of a synthesis results according to one embodiment of the present disclosure. In particular, as shown in FIG. 10, as a first example, the word "purchase" is synthesized and inserted into a recording where it is surrounded by silence. Because, according to this example, multiple copies of the word "purchase" exist in the corpus, but because they are all chained with neighboring context words they would be unsuitable for simply copying into a silent context.

Instead, according to one embodiment of the present disclosure interactive voice editing system 200 may find different combination of audio pieces where "PUR" is from "pursue" (preceded by silence) and "ASE" is from the ending of "this" (followed by silence). Between those fragments, the middle part of "speeches" connects them. Note that because of exchangeable triphones, "Z" and "S" are allowed to be matched.

The next example shown in FIG. 10 is a homophone. The query is "prophet" without context. The result obtained have no break at all. Instead, the result is one solid piece of the word "profit". This demonstrates how interactive voice editing system 200 may not only find exact word matches if they exist, it also finds homophones if they fit. The following show the query and the piece(s) used to synthesize that query. The first row is the query's phoneme 152 decomposition. Then the row below it shows information about a piece, including sentence ID, frame numbers, phonemes 152 and words contained in this piece.

Query: P R AA1 F AH0 T (prophet)
u0518: (334-407) P|R|AA1|AH0|T (profit)

A third example is alternative synthesis. When putting the word "poison" between "the" and "of the strange vegetation", alternative combinations of pieces that have different prosody and styles may be obtained:

Query: P OY1 Z AH0 N (poison)
COMBINATION 1:
u0277: (359-448) P|OY1|Z|AH0|N (poisonous)
COMBINATION 2:
u0277: (359-402) P|OY1 (poisonous)
u0412: (107-120) Z (is)
u0519: (243-277) Z|AH0|N (is in)
COMBINATION 3:
u0141: (309-354) P|OY1 (pointing)
u0020: (073-121) Z|AH0|N (clubs and)

Although the second alternative combination has the largest number of breaks, it sounds most natural within the context. It is selected in the sampling method because it has competitive pitch continuity with other alternative syntheses. Also note that segments 164 are selected across words if there is no silence detected between them.

Mean Opinion Score ("MOS") Tests

Figure 11A:
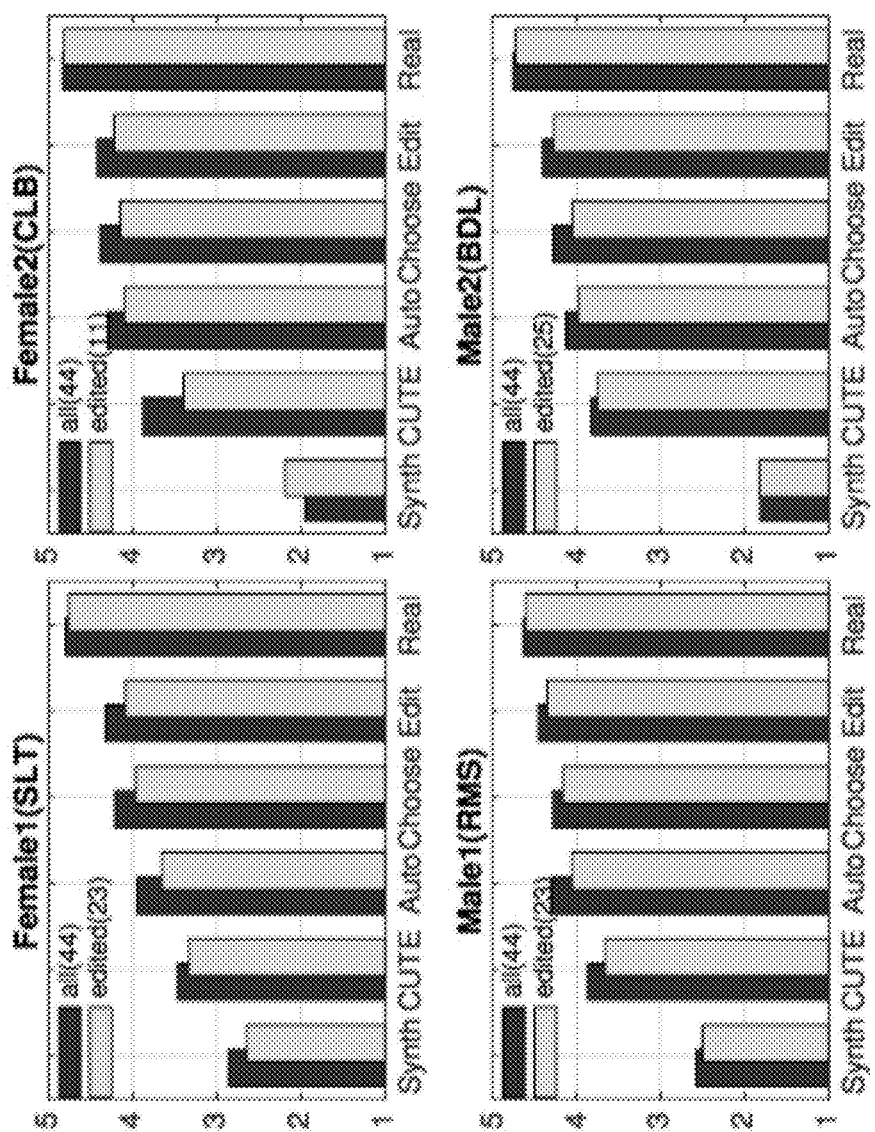
FIG. 11a shows a MOS test comparing synthesis results of an interactive voice editing system to baseline methods according to one embodiment of the present disclosure.

FIG. 11a shows a MOS test comparing synthesis results of an interactive voice editing system to baseline methods according to one embodiment of the present disclosure. According to one embodiment, experiments were conducted in Amazon Mechanical Turk to evaluate interactive voice editing system 200 and associated voice synthesis results. A first MOS test asks subjects to rate the quality of the inserted synthetic words.

Figure 11B:
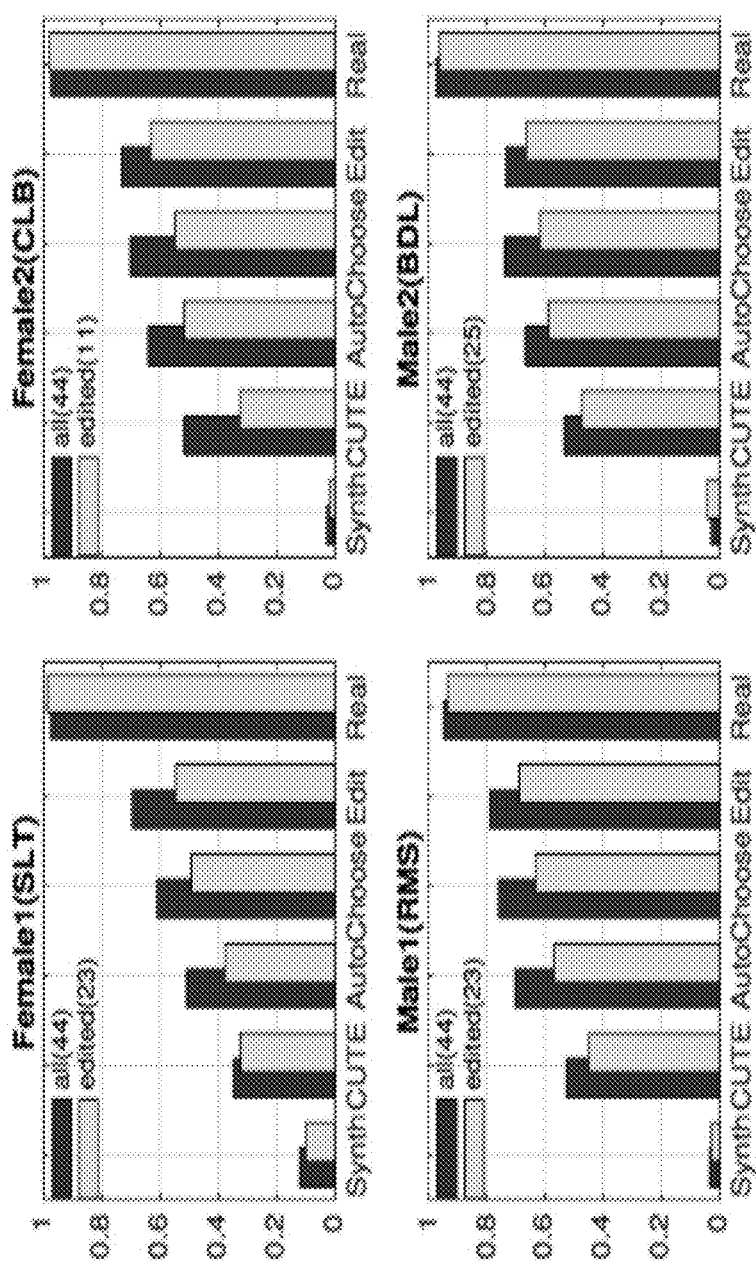
FIG. 11b shows an identification test for an interactive voice editing system where subjects will tell whether they think a sentence has been edited or not compared with baseline methods according to one embodiment of the present disclosure.

FIG. 11b shows an identification test for an interactive voice editing system where subjects will tell whether they think a sentence has been edited or not compared with baseline methods according to one embodiment of the present disclosure. In the Identification test, a subject was presented one sentence was drawn from the six conditions described above (Synth, CUTE, Auto, Choose, Edit and Real) and informed that there may or may not be one word edited using a computer. The task was to identify if the recording as original or edited.

With respect to FIGS. 11a-11b, four voices, two male and two female, from the CMU Arctic dataset were used to create test samples. The first 800 utterances (40 minutes) were used for training and the remaining 332 utterances for word replacement. 44 words were chosen at random that span 4 to 11 phonemes 152 from 44 different sentences. For each sentence, the chosen word was removed, synthesized and inserted in the same location to create a recording with one word altered. The same word was synthesized using various other methods for comparison. There were 6 conditions where sentences were generated:

Synth. The source TTS voice was used to synthesize the word and put into context.
CUTE. A word synthesis method called CUTE was used instead of the one performed by system 200 for the voice conversion.
Auto. System 200 was utilized in conjunction with predefined α and β values in range selection.
Choose. One synthesis method was chosen from a number of alternatives (up to 16), if it improved on Auto above.
Edit. The editing interface described above was used to further refine the synthesis, if it improved on Auto/Choose.
Real. The actual recording was utilized without modification.

Figure 12:
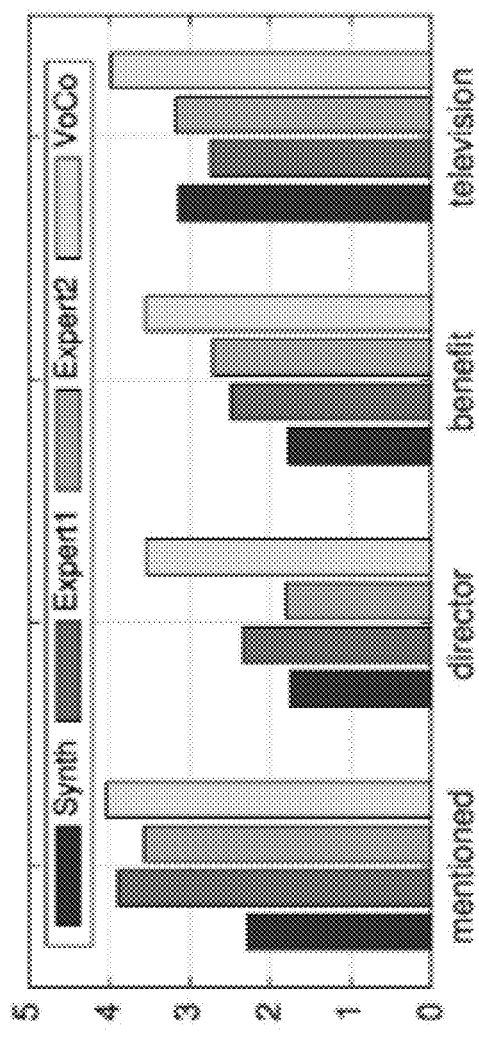
FIG. 12 is a plot showing an identification test as a function of a number of breaks in synthesis according to one embodiment of the present disclosure.

FIG. 12 is a plot showing an identification test as a function of a number of breaks in synthesis according to one embodiment of the present disclosure. As shown in FIG. 12a, for female voices, the result degrades significantly as the number of breaks increases while for male voices, the voice is less strong.

Figure 13:
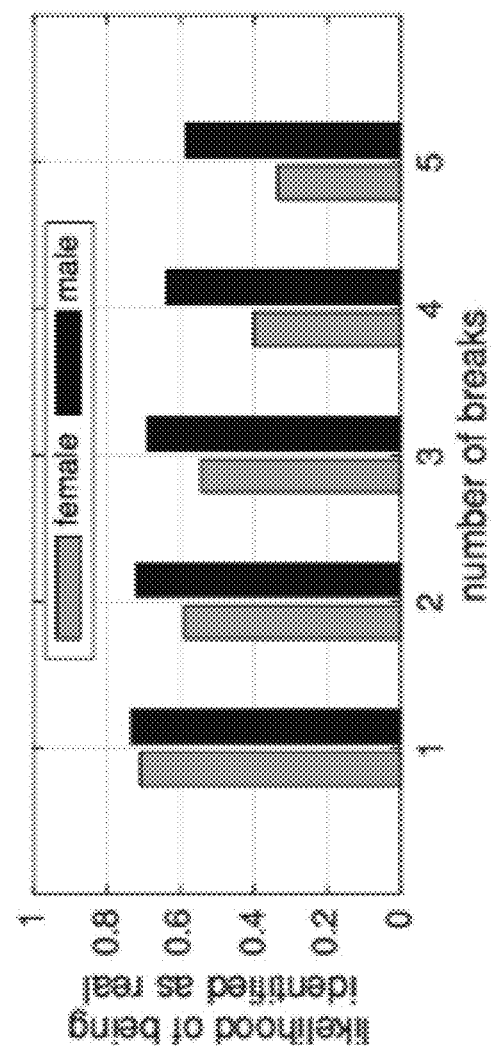
FIG. 13 a plot showing MOS scores for experts and algorithms replacing words in sentences with synthesized words according to one embodiment of the present disclosure.

FIG. 13 a plot showing MOS scores for experts and algorithms replacing words in sentences with synthesized words according to one embodiment of the present disclosure. The words utilized were mentioned, director, benefit and television. As shown in FIG. 13b system 200 outperformed the experts while Synth provides a baseline.

Figure 14A:
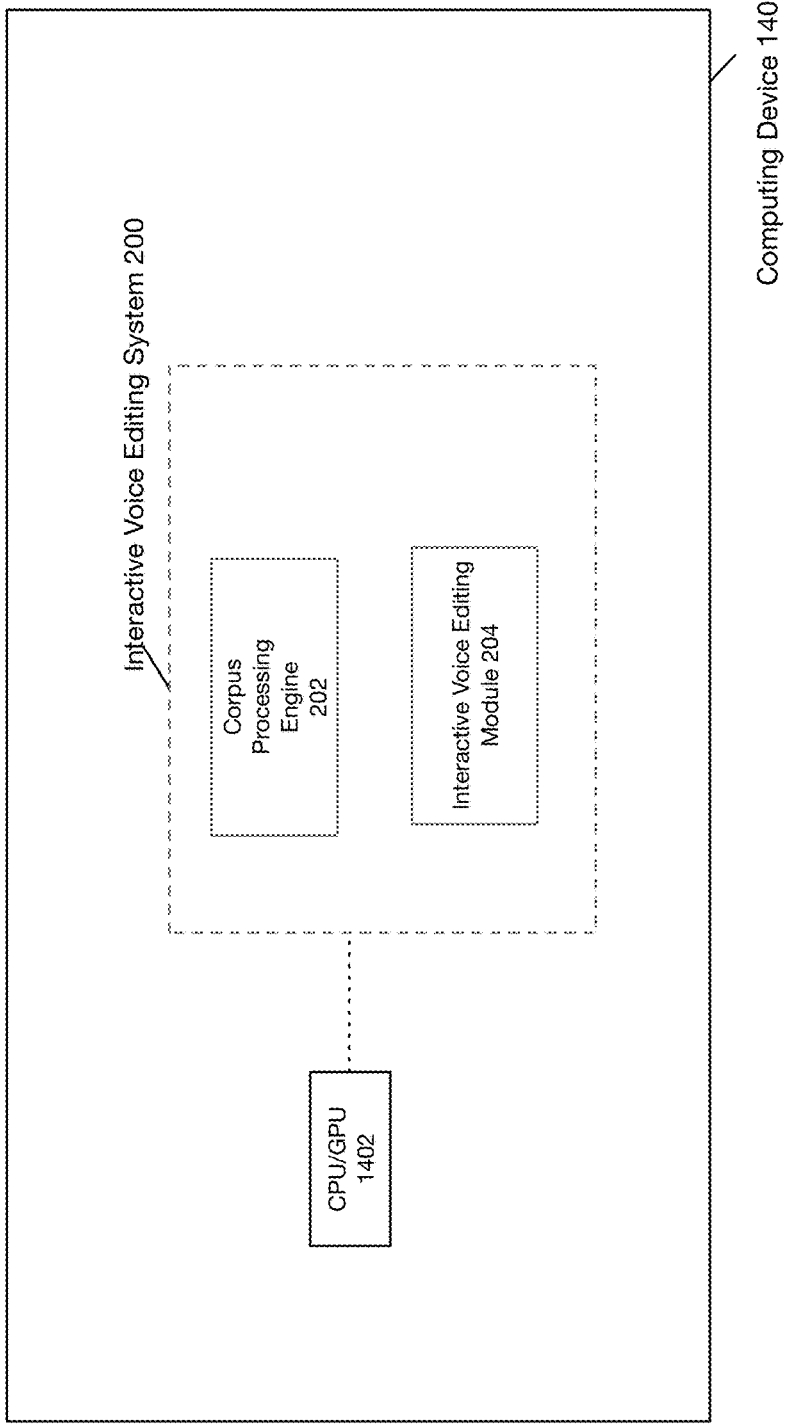
FIG. 14a illustrates an example computing system that executes an interactive voice editing system in accordance with embodiments of the present disclosure.

FIG. 14a illustrates an example computing system that executes an interactive voice editing system in accordance with embodiments of the present disclosure. As depicted in FIG. 14a, computing device 1400 includes CPU/GPU 1402 and interactive voice editing system 200. Interactive voice editing system 200 may be understood to be comprise programmatic structures for performing interactive voice editing. In particular, CPU/GPU 1402 may be further configured via programmatic instructions to execute interactive voice editing system 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 600 can be any stand-alone computing platform, such as a desk top or work station computer, laptop computer, tablet computer, smart phone or personal digital assistant, game console, set-top box, or other suitable computing platform.

Figure 14B:
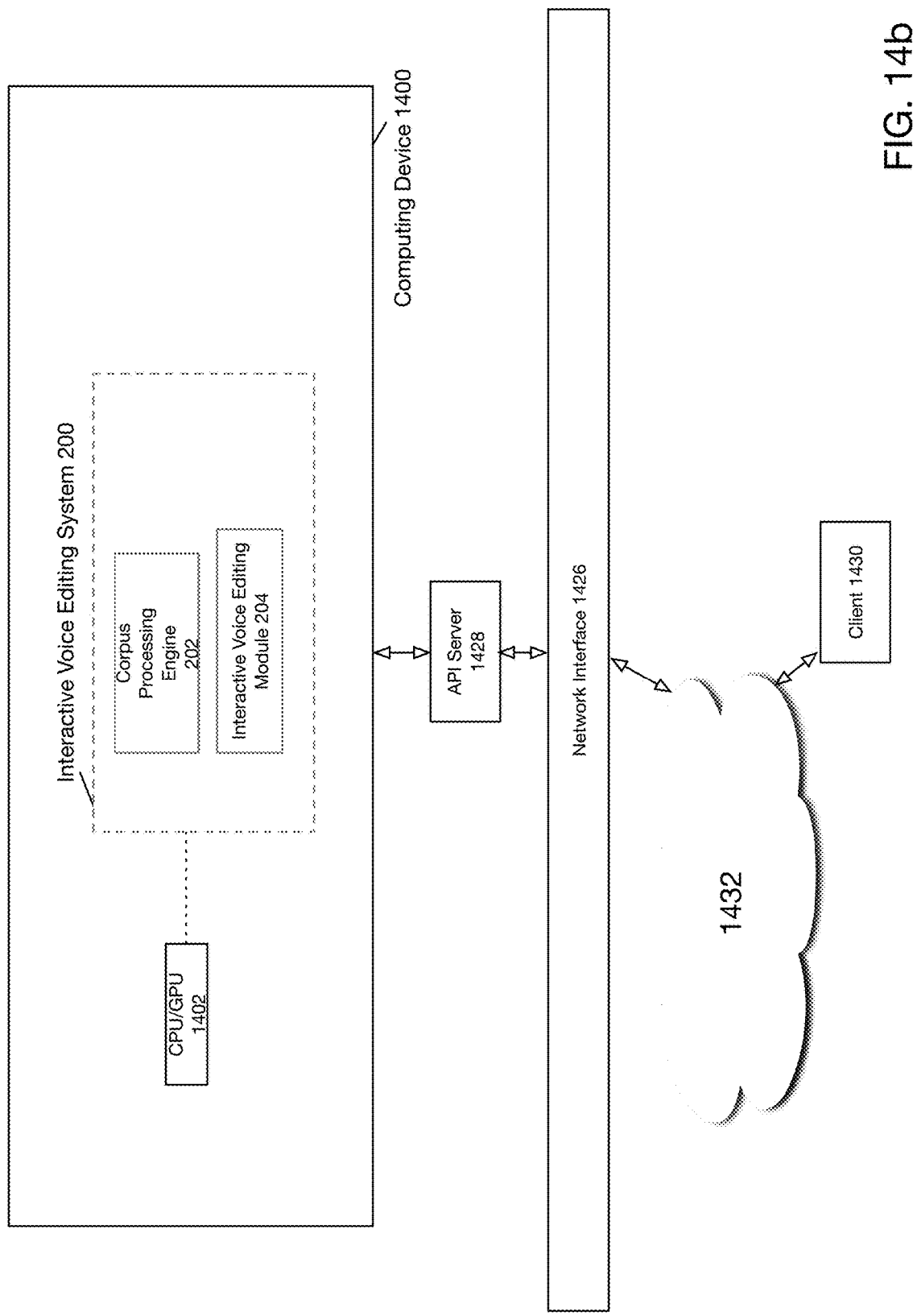
FIG. 14b illustrates an example integration of an interactive voice editing system into a network environment according to one embodiment of the present disclosure.

FIG. 14*b* illustrates an example integration of an interactive voice editing system into a network environment according to one embodiment of the present disclosure. As depicted in FIG. 14*b*, computing device 1400 may be collocated in a cloud environment, data center, local area network ("LAN") etc. Computing device 1400 shown in FIG. 14*b* is structured identically to the example embodiment described with respect to FIG. 14*a*. In this instance, computing device 1400 may be a server or server cluster, for example. As shown in FIG. 14*b*, client 1430 interacts with computing device 1400 via network 1432. In particular, client 1430 may make requests and receive responses via API calls received at API server 1428, which are transmitted via network 1432 and network interface 1426. It will be understood that network 1432 may comprise any type of public or private network including the Internet or LAN.

It will be further readily understood that network 1432 may comprise any type of public and/or private network including the Internet, LANs, WAN, or some combination of such networks. In this example case, computing device 1400 is a server computer, and client 1430 can be any typical personal computing platform As will be further appreciated, computing device 1400, whether the one shown in FIG. 6*a* or 6*b*, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 1432, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for performing text-based insertion and replacement in a target voice waveform comprising receiving a query text, said query text indicating one of a replacement and an insertion in a voice transcript associated with said target voice waveform, for each phoneme associated with said query text, generating an audio frame range, wherein said audio frame range comprises a portion of said target voice waveform, and, generating an edited waveform by modifying said target voice waveform using said audio frame range.

Example 2 is the method of Example 1 further comprising generating a query waveform from said query text, processing said query waveform to generate a first segment, wherein said first segment corresponds to a phoneme in said target voice waveform, processing said query waveform to generate a query exemplar, performing a range selection process utilizing said query exemplar and said first segment to generate a proposed range, and, generating an edited waveform by modifying said target voice waveform using said proposed range.

Example 3 is the method of Example 2, wherein processing said query waveform to generate a first segment further comprises processing said query waveform to generate a second segment and, processing said second segment to generate said first segment.

Example 4 is the method of Example 3, wherein said second segment is generated by performing a triphone pre-selection process and said first segment is generated by performing a dynamic triphone pre-selection process.

Example 5 is the method of Example 2, wherein processing said query waveform to generate a query exemplar further comprises extracting a feature associated with said query waveform to generate query feature data, and, processing said query feature data to generate said query exemplar.

Example 6 is the method of Example 5, wherein said query exemplar is generated by concatenating a plurality of features associated with query feature data.

Example 7 is the method of Example 2, wherein said query waveform is generated by applying a text-to-speech ("TTS") voice to said query text.

Example 8 is a system for performing text-based insertion and replacement in a target voice waveform comprising a corpus processing engine, wherein said corpus processing engine further comprises a TTS selection module and a voice conversion module generator, an interactive voice editing module, wherein said interactive voice editing module further comprises a query input module, a source TTS voice and, a voice conversion module.

Example 9 is the system of Example 8, wherein said voice conversion module generator generates said voice conversion module.

Example 10 is the system of Example 8, wherein said TTS selection module generates said source TTS voice.

Example 11 is the system of Example 8, wherein said voice conversion module further comprises an exemplar extraction module, wherein said exemplar extraction module generates a query exemplar based upon a query waveform, and a segment selection module, wherein said segment selection module generates a segment based upon said query waveform and segment selection data and, a range selection module, wherein said range selection module generates a range of exemplars based upon said query exemplar and said segment.

Example 12 is the system of Example 8, further comprising an exemplar-to-edited waveform block, wherein said exemplar-to-edited waveform block further comprises an exemplar to waveform translator module and a concatenative synthesis module.

Example 13 is the system of Example 12, wherein said exemplar to waveform translator module receives an exemplar and a target voice waveform and generates an audio snippet and a context waveform.

Example 14 is the system of Example 13, wherein said concatenative synthesis module generates an edited waveform based upon said audio snippet and said context waveform.

Example 15 is a computer program product including one or more non-transitory machine-readable mediums encoded with instructions that when executed by one or more processors cause a process to be carried out for performing text-based insertion and replacement a target voice waveform, said process comprising receiving a query text, generating a query waveform from said query text, processing said query waveform to generate a first segment, wherein said first segment corresponds to a phoneme in said target voice waveform, processing said query waveform to generate a query exemplar, performing a range selection process utilizing said query exemplar and said first segment to generate a proposed range, and, generating an edited waveform by modifying said target voice waveform using said proposed range.

Example 16 is the computer program product of Example 15, wherein processing said query waveform to generate a first segment further comprises processing said query waveform to generate a second segment, and, processing said second segment to generate said first segment.

Example 17 is the computer program product of Example 16, wherein said second segment is generated by performing a triphone pre-selection process and said first segment is generated by performing a dynamic triphone pre-selection process.

Example 18 is the computer program product of Example 15, wherein processing said query waveform to generate a query exemplar further comprises extracting a feature associated with said query waveform to generate query feature data, and, processing said query feature data to generate said query exemplar.

Example 19 is the computer program product of Example 18, wherein said query exemplar is generated by concatenating a plurality of features associated with query feature data.

Example 20 is the computer program product of Example 15, wherein said query waveform is generated by applying a text-to-speech ("TTS") voice to said query text.

What is claimed is:

1. A method for performing text-based insertion in a target voice waveform, the method comprising:
   receiving a query text that indicates an insertion in a voice transcript associated with said target voice waveform; and
   for each phoneme associated with said query text, generating an audio frame range that comprises a portion of said target voice waveform, wherein generating the audio frame range comprises
   generating a query waveform from said query text,
   processing the query waveform to generate a query exemplar,
   performing a range selection process to generate the audio frame range, wherein the range selection process uses the query exemplar and a first segment that corresponds to a phoneme in said target voice waveform, and wherein the audio frame range comprises a range of consecutive frames that encompasses at least a portion of the first segment, and
   generating an edited waveform by modifying said target voice waveform using said audio frame range.

2. The method according to claim 1, wherein said first segment is generated by processing said query waveform that is generated from the query text.

3. The method according to claim 1, further comprising processing said query waveform to generate the first segment by:
   processing said query waveform to generate a second segment; and,
   processing said second segment to generate said first segment.

4. The method according to claim 3, wherein said second segment is generated by performing a triphone pre-selection process and said first segment is generated by performing a dynamic triphone pre-selection process.

5. The method according to claim 1, wherein processing said query waveform to generate the query exemplar further comprises:
   extracting a feature associated with said query waveform to generate query feature data; and,
   processing said query feature data to generate said query exemplar.

6. The method according to claim 5, wherein said query exemplar is generated by concatenating a plurality of features associated with the query feature data.

7. The method according to claim 1, wherein said query waveform is generated by applying a text-to-speech ("TTS") voice to said query text.

8. A system for performing text-based insertion in a target voice waveform comprising:
- a corpus processing engine that comprises
  - a text-to-speech ("TTS") selection module that generates a source TTS voice, and
  - a voice conversion module generator that generates a voice conversion module;
- an interactive voice editing module that comprises a query input module, the source TTS voice, and the voice conversion module; and
- an exemplar-to-edited waveform block that comprises an exemplar to waveform translator module and a concatenative synthesis module, wherein the exemplar to waveform translator module receives an exemplar and a target voice waveform and generates an audio snippet and a context waveform.

9. The system according to claim 8, wherein said voice conversion module further comprises:
- an exemplar extraction module, wherein said exemplar extraction module generates a query exemplar based upon a query waveform;
- a segment selection module, wherein said segment selection module generates a segment based upon said query waveform and segment selection data; and,
- a range selection module, wherein said range selection module generates a range of exemplars based upon said query exemplar and said segment.

10. The system according to claim 8, wherein said concatenative synthesis module generates an edited waveform based upon said audio snippet and said context waveform.

11. A computer program product including one or more non-transitory machine-readable mediums encoded with instructions that when executed by one or more processors cause a process to be carried out for performing text-based insertion and replacement a target voice waveform, said process comprising:
- receiving a query text;
- generating a query waveform from said query text;
- processing said query waveform to generate a first segment, wherein said first segment corresponds to a phoneme in said target voice waveform;
- processing said query waveform to generate a query exemplar;
- performing a range selection process utilizing said query exemplar and said first segment to generate a proposed range, wherein the proposed range comprises a range of consecutive frames that encompasses at least a portion of the first segment; and,
- generating an edited waveform by modifying said target voice waveform using said proposed range.

12. The computer program product according to claim 11, wherein processing said query waveform to generate the first segment further comprises:
- processing said query waveform to generate a second segment; and,
- processing said second segment to generate said first segment.

13. The computer program product according to claim 12, wherein said second segment is generated by performing a triphone pre-selection process and said first segment is generated by performing a dynamic triphone pre-selection process.

14. The computer program product according to claim 11, wherein processing said query waveform to generate the query exemplar further comprises:
- extracting a feature associated with said query waveform to generate query feature data; and,
- processing said query feature data to generate said query exemplar.

15. The computer program product according to claim 14, wherein said query exemplar is generated by concatenating a plurality of features associated with the query feature data.

16. The computer program product according to claim 11, wherein said query waveform is generated by applying a text-to-speech ("TTS") voice to said query text.

* * * * *